United States Patent
Grandhi et al.

(10) Patent No.: US 8,326,823 B2
(45) Date of Patent: Dec. 4, 2012

(54) NAVIGATION FOR LARGE SCALE GRAPHS

(75) Inventors: Roopnath Grandhi, Sunnyvale, CA (US); Neelakantan Sundaresan, Mountain View, CA (US); Hill Trung Nguyen, San Jose, CA (US)

(73) Assignee: eBay Inc., San Jose, CA (US)

( * ) Notice: Subject to any disclaimer, the term of this patent is extended or adjusted under 35 U.S.C. 154(b) by 851 days.

(21) Appl. No.: 12/263,390

(22) Filed: Oct. 31, 2008

(65) Prior Publication Data
US 2009/0204582 A1 Aug. 13, 2009

Related U.S. Application Data

(60) Provisional application No. 60/984,675, filed on Nov. 1, 2007, provisional application No. 61/101,121, filed on Sep. 29, 2008.

(51) Int. Cl.
*G06F 17/30* (2006.01)

(52) U.S. Cl. ........ 707/717; 707/731; 707/737; 707/776; 707/797; 707/798; 345/440

(58) Field of Classification Search .................. 707/717, 707/731, 737, 739, 776, 777, 797, 798, 707/999.001–999.007, 709; 345/440
See application file for complete search history.

(56) References Cited

U.S. PATENT DOCUMENTS

| | | | |
|---|---|---|---|
| 5,544,352 A * | 8/1996 | Egger | 707/999.005 |
| 5,940,821 A * | 8/1999 | Wical | 1/1 |
| 6,523,026 B1 * | 2/2003 | Gillis | 1/1 |
| 7,730,085 B2 * | 6/2010 | Hassan et al. | 707/776 |
| 7,750,908 B2 * | 7/2010 | Kincaid et al. | 345/440 |
| 7,840,524 B2 * | 11/2010 | Egger et al. | 707/709 |
| 2002/0091678 A1 * | 7/2002 | Miller et al. | 707/3 |
| 2004/0267686 A1 * | 12/2004 | Chayes et al. | 707/1 |
| 2005/0147442 A1 * | 7/2005 | Walker et al. | 400/76 |
| 2006/0053176 A1 * | 3/2006 | Thorpe et al. | 707/203 |
| 2006/0224562 A1 * | 10/2006 | Yan et al. | 707/2 |

(Continued)

FOREIGN PATENT DOCUMENTS

EP 1717755 A2 * 11/2006

OTHER PUBLICATIONS

Weaver, C.; "Multidimensional data dissection using attribute relationship graphs"; Visual Analytics Science and Technology (VAST), 2010 IEEE Symposium Sep. 2010; p. 82-82.*

Rodgers, P.; Leishi Zhang; Stapleton, G.; Fish, A.;"Embedding Wellformed Euler Diagrams"; Information Visualisation, 2008. IV '08. 12th International Conference; 2008; p. 593-593.*

Greg Butler; Guang Wang; Yue Wang; Liqian Zou.; "Query Optimization for a Graph Database with Visual Queries"; Notes in Computer Science; Mar. 11, 2006. vol. 3882.*

*Primary Examiner* — Dennis Truong

(74) *Attorney, Agent, or Firm* — Schwegman Lundberg & Woessner, P.A.

(57) ABSTRACT

A method is illustrated as retrieving a plurality of search queries and defining relationships between search queries in the plurality of search queries based on semantic data associated with the search queries. A visual representation of the plurality of search queries may be generated and the visual representation may be partitioned into a plurality of tiles, each tile representing a predefined portion of the visual representation.

17 Claims, 17 Drawing Sheets

U.S. PATENT DOCUMENTS

| | | | |
|---|---|---|---|
| 2006/0227153 A1* | 10/2006 | Anwar et al. | 345/660 |
| 2007/0112842 A1* | 5/2007 | Gould et al. | 707/102 |
| 2007/0124291 A1* | 5/2007 | Hassan et al. | 707/3 |
| 2007/0171716 A1* | 7/2007 | Wright et al. | 365/185.12 |
| 2007/0208719 A1* | 9/2007 | Tran | 707/3 |
| 2008/0154886 A1* | 6/2008 | Podowski et al. | 707/5 |
| 2008/0155426 A1* | 6/2008 | Robertson et al. | 715/738 |
| 2008/0162514 A1* | 7/2008 | Franks et al. | 707/100 |
| 2009/0019031 A1* | 1/2009 | Krovitz et al. | 707/5 |
| 2009/0115785 A1* | 5/2009 | Grandhi et al. | 345/440 |

* cited by examiner

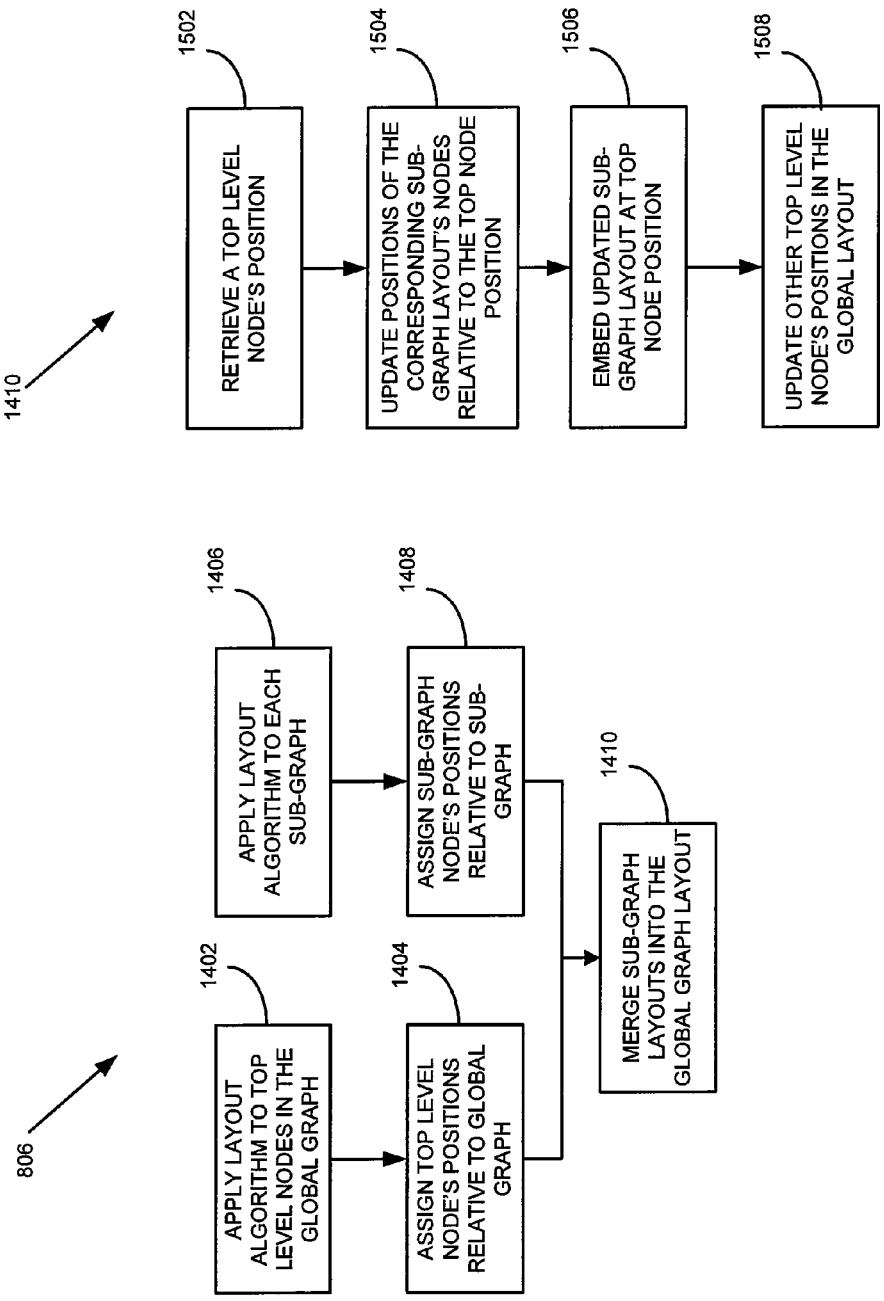

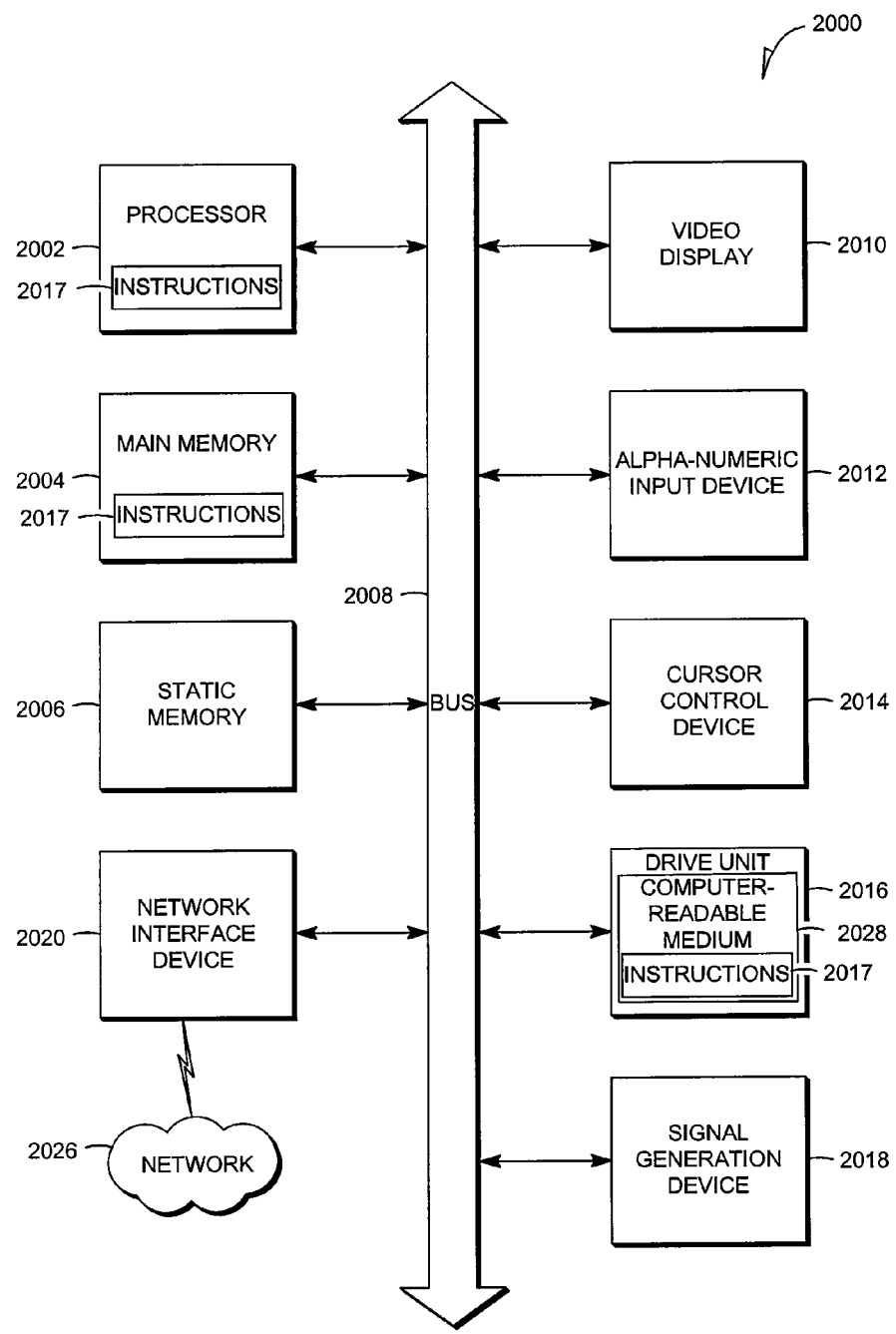

US 8,326,823 B2

NAVIGATION FOR LARGE SCALE GRAPHS

CLAIM OF PRIORITY

This patent application claims the benefit of priority, under 35 U.S.C. Section 119(e), to U.S. Provisional Patent Application Ser. No. 60/984,675, entitled "USER INTERFACE FRAMEWORK FOR VIEWING LARGE SCALE GRAPHS ON THE WEB," filed on Nov. 1, 2007; and claims the benefit of priority, under 35 U.S.C. Section 119(e), to U.S. Provisional Patent Application Ser. No. 61/101,121 entitled "NAVIGATION FOR LARGE SCALE GRAPHS," filed on Sep. 29, 2008.

TECHNICAL FIELD

The present application relates generally to the technical field of searching.

BACKGROUND

Data may be represented visually in the form of a graph. A graph may have nodes that represent the data and edges that connect the nodes together. Some nodes may be connected to more than one other node. Some nodes may not be connected to any nodes. The edges allow a person to see the relationship between two nodes and therefore the relationship between the underlying data. The data may be related to items for sale. Users may search items for sale using a search query. The results of the query may be presented to a user in the form of a list of items for sale that match the search query.

BRIEF DESCRIPTION OF THE DRAWINGS

Some example embodiments are illustrated by way of example and not limitation in the figures of the accompanying drawings in which:

FIG. 14 illustrates an example flowchart illustrating a method, according to an example embodiment, to define a global layout.

FIG. 15 illustrates an example flowchart of a method, according to an example embodiment, to merge sub-graph layouts into the global graph layout.

FIG. 20 shows a diagrammatic representation of a machine in the example form of a computer system according to an example embodiment.

DETAILED DESCRIPTION

Figure 1:
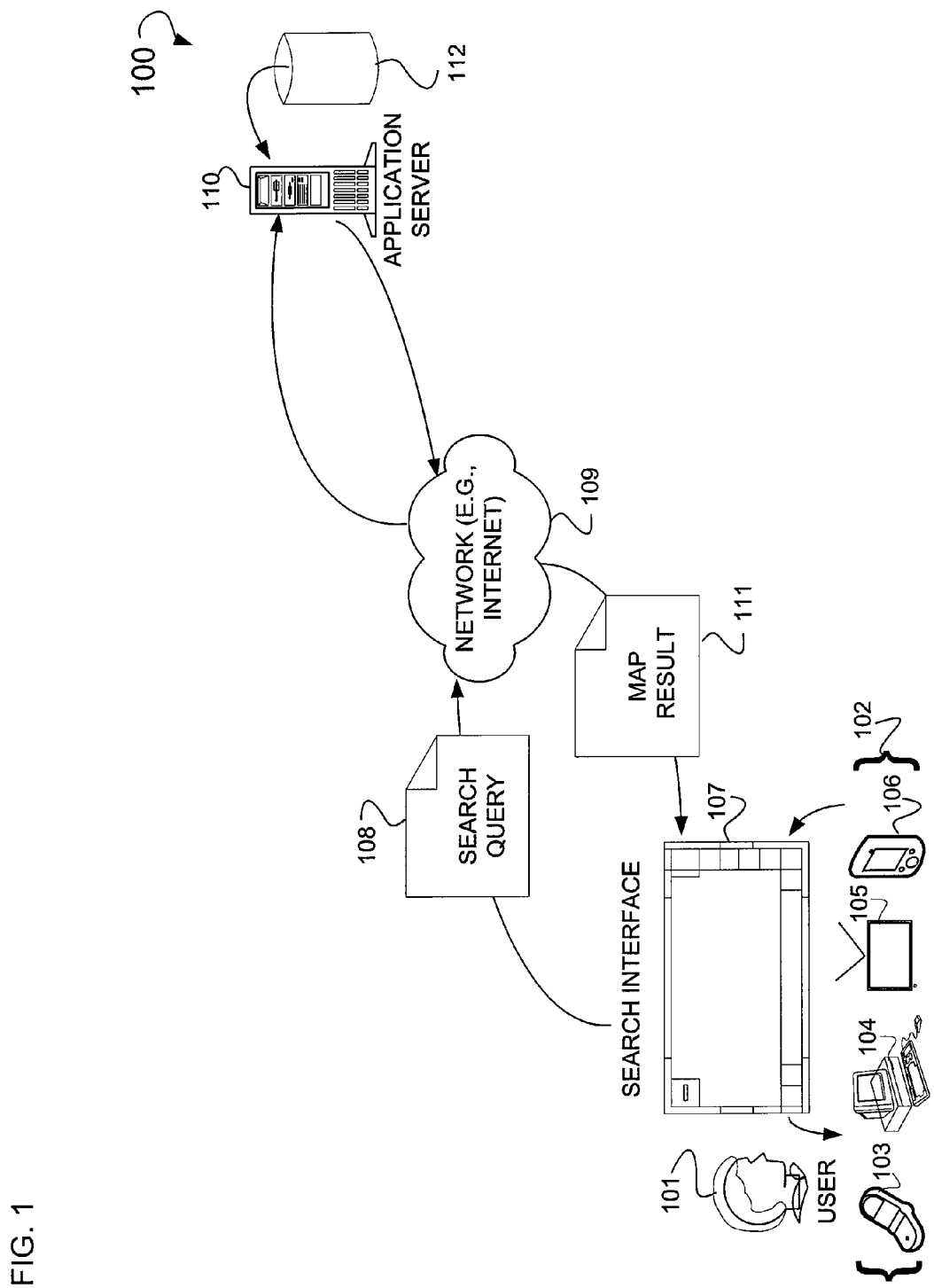
FIG. 1 is a diagram of a system, according to an example embodiment, for navigation of large scale graphs.

In some example embodiments, a system or method is illustrated for displaying items for sale on an internet website. In an example embodiment, a user of the website submits a search query to the website to identify a particular sale item, or item of interest. In order to facilitate the user's search, a visual representation of search queries submitted to the website may be constructed in the form of a map and presented to the user where each search query may be represented as a point on the map in the form of a node. In an example embodiment, each node on the map is shown as a circle with the search query displayed inside. The user may interact with the map by zooming in and out of the map or by panning around the map.

The map may be organized in a way that mirrors semantic relationships between two search queries. For example, search queries that relate to books may be clustered together in one area of the map while search queries related to vehicles may be clustered in another area of the map. Further, related search queries may have lines drawn between them to help a user see the semantic relationships. For example, book and vehicle search queries may not generally have lines drawn between them, but the search query "Ford Mustang" may have a line drawn to the search query "American Car Books." In this manner a user can move beyond his or her initial search to related topics.

The area of the map that the user sees initially may be considered the starting location. The map may be initially centered on the node that matches the user's search query. In one example embodiment, a user is able to navigate between nodes in the graph based upon titles and, more specifically, the semantic contexts and relationships created by groupings of the nodes in the graph. A semantic relationship may be defined such that closely related search queries are placed closer together and unrelated search queries are placed further apart. Closeness is defined herein as having fewer edges between a pair of nodes relative to another pair of nodes. Farther apart is defined herein as having more edges between two nodes, relative another pair of nodes. For example, the search query "Books" may be assigned a position close to the search query "Harry Potter," but may be far away from "Cars."

In some example embodiments, the map is constructed in the following manner. Top search queries may be determined (e.g., the most popular searches) and may be considered top level nodes. In an example embodiment, in order to generate the visual representation, relationships between the top level nodes may need to be determined. This may be done be organizing the top level nodes in the form of a graph and defining connections in the form of edges between the top level nodes. In an example embodiment, a top level node may be "iPod." Sub-graphs may be constructed for each top-level node. In an example embodiment, the item listings resulting from searching for the top level node may be clustered using a suffix tree algorithm. For example, to construct the subgraph around the top level node "iPod," we may take all the item listing search results in the website for the search query "iPod" and cluster the item titles of the search results using a suffix tree.

In an example embodiment, the resulting node and edge information from the global graph and sub-graph constructions is referenced herein as graph data. The graph data may also include attribute data for the nodes in the graph data. The attribute data may include information on how to render the node in the map. For instance, if the node represents one of the most common search queries, the attribute data may define the size of the node that is ultimately displayed to the user in the map. For example, a top ten search query may be twice as large as a top one hundred search query (e.g., a 100 pixel circle versus a 50 pixel circle). The attribute data may also define a minimum and maximum zoom display level for a node. Like a traditional geographic map, a user may wish to zoom in and out, allowing more or less information to be displayed. In an example embodiment, a node is only displayed at certain zoom level as defined by the attribute data.

In an example embodiment, a graph layout component may use the graph data and compute the layout of the graph. The layout refers to the structure that underlies the map that is displayed to the user. In an example embodiment, the edges have already been defined by the graph data and the layout component may space the nodes in a visually pleasing manner. This may be done by assigning positions to the nodes in the graph data. The positions of the nodes may be such that closely related nodes are placed adjacent to each other. In an example embodiment, closely related means nodes that share similar traits (e.g., they are all books). By placing similar nodes close together a user may quickly see other items related to their initial search query. In an example embodiment, the positions may be absolute ensuring that when a user zooms in and out, the nodes will maintain the same positions relative to one another. In an example embodiment, when the layout is defined in this way, the resulting layout is a semantic representation of the search query and item listing information in the website. As the graph data may include data on a global graph and multiple sub-graphs, there may also be a global layout and multiple sub-layouts. Thus, the graph data may define relationships between nodes and the graph layouts may define the positions of the nodes.

In an example embodiment, a rendering component may render the graph layout as a series of tile images and store them on the website where each tile represents a portion of the overall visual representation of the search queries. In an example embodiment, when a user submits a search query the website may retrieve the tile image corresponding to that search query and the tiles surrounding it. In this manner, the website may only transmit the tile images that are relevant to the user. In an example embodiment, each zoom level of the layout has a different set of tile images. The tile size may be defined at the website. On the user side, asynchronous JavaScript and Extensible Markup Language (XML), otherwise known as AJAX, may be used to dynamically retrieve the tile images of the graph as a user pans and zooms to explore the graph. In an example embodiment, this allows a user to navigate a large scale graph of item listing data in an efficient and intuitive manner.

FIG. 1 is a diagram of an example system 100 illustrating a system to navigate large scale graphs of item listing data. Shown is a user 101 utilizing a search interface 107 that resides on any one of a number of user devices 102. These devices 102 may include, for example, a cell phone 103, a computer system 104, a television 105, and/or a Personal Digital Assistant (PDA) 106. The user 101 may generate a query 108. Query 108 may be, for example, a search query generated for the purposes of searching a web accessible database of item listing data. In one example embodiment, the query 108 is sent across a network 109 to an application server 110. Once received by the application server 110, the query 108 may be parsed to format a map result 111. The map result may include a starting location that is displayed on the search interface 107 along with one or more items. The application server 110 may be operatively coupled to an item listing database 112 that may store the listings. The application server 110 may also store a map of common search queries. The map may be constructed using a number of the below illustrated operations, and may be built to allow semantic navigation.

The application server 110 may have preferences for the creation of and rendering of graph data stored in a database coupled to the application server 100. These preferences may include a definition of an XML format for which input graph data needs to be specified. Along with the node and edge information, the graph data may define several visual attributes of the node and other configuration parameters like number of zoom levels, size of the tiles at each of the zoom levels etc. Each node in the graph can also have a defined minLevel and a maxLevel between which the node is displayed.

In some example embodiments, search query 108 may be sent to more than one application server 110. Further, application server 110 may be connected to a plurality of additional application servers. Additionally, application server 110 may be connected to a plurality of other databases in addition to item listing database 112. Further, though not depicted, this application server 110 and/or a plurality of application servers may be operatively coupled to any one of a number of database servers that may serve as an intermediary between the application server 110 and databases such as the item listing database 112.

In some example embodiments, for a given query (e.g., a search query), the system may obtain map results 111 for that particular query. This may be achieved through an API call made to a search back end. Subsequently, a HTTP based method call is made to obtain a starting node for that particular query from in a graph layout. In some example embodiments, the search query may match exactly to a node in the graph. In other example embodiments the returned starting node may be the most relevant to the search query. Next, a plurality of image files are retrieved from the application sever 110 that are associated with the starting node. In some example embodiments these image files are stored on the application server or in databases communicatively coupled to the application server.

In an example embodiment, relationships between the top search queries are generally static. However, in some example embodiments, relationships between search queries are updated periodically. Image files associated with map may also be updated. For example, an auction website may wish to have the most recent item listings displayed. The application server 110 may provide a way to add attribute data about interacting with the node such as images, mouse over text, text description and link URLS.

Figure 2:
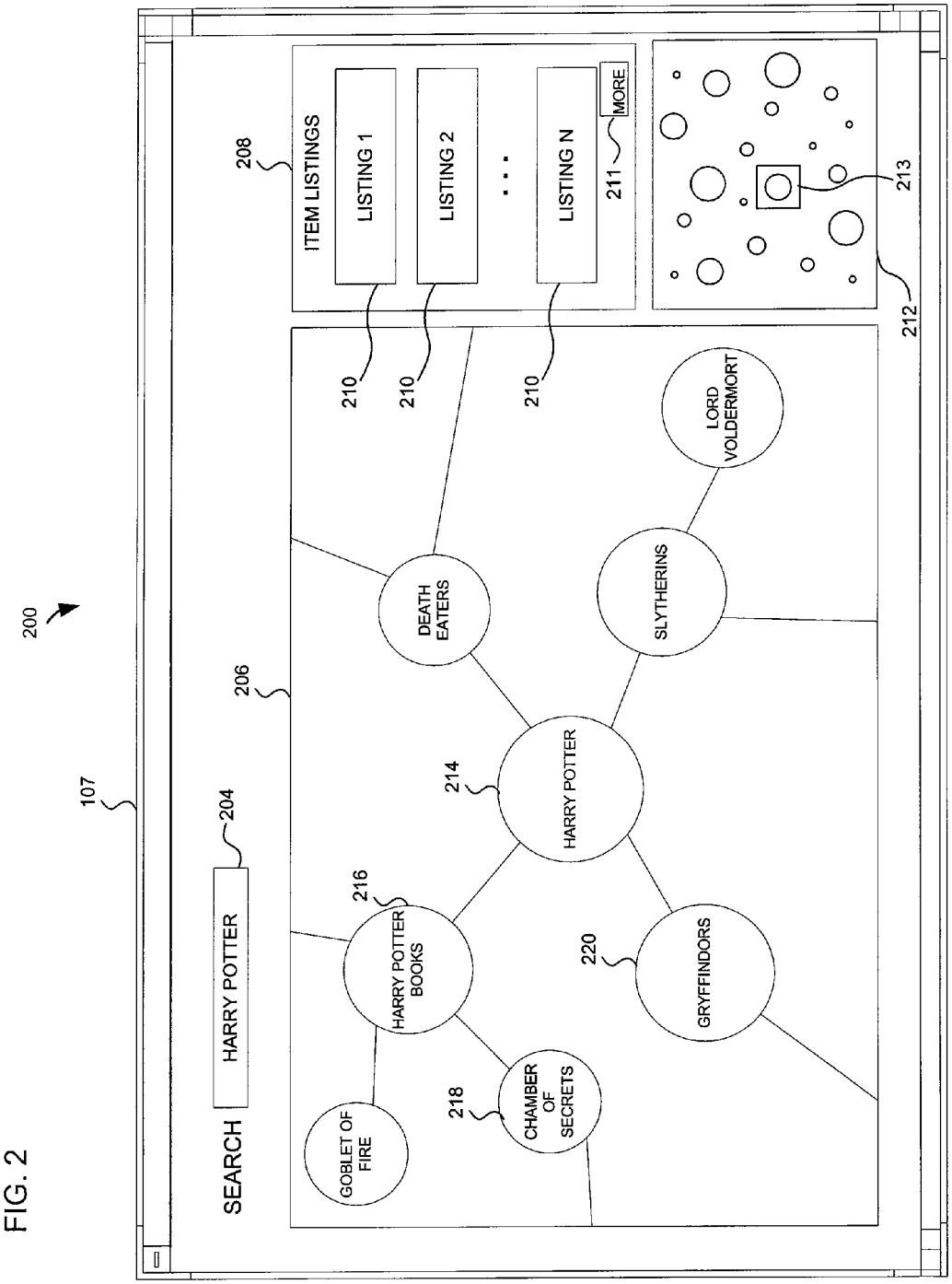
FIGS. 2-3 illustrate user interfaces, according to various example embodiments.

FIG. 2 is an example user interface 200 that a user may use to conduct a search and navigation a portion of the map. Search interface 107 may display a search box 204, a navigation section 206, an item listings section 208, and an overview map 212. The search box may accept input from a user including a search query. In an example embodiment, the search query is "Harry Potter." The navigation section 206 may display the image files of the map corresponding to the node "Harry Potter." There may be multiple image files for the node "Harry Potter" as the area of the map the node may displayed as well.

In an example embodiment, multiple example nodes, 214, 216, 218, and 220 are displayed to a user that may be related to the search query. In the navigation section 206, example node 214 is a node associated with the search query "Harry Potter." The nodes may be laid out in such a way to allow semantic navigation. For example, in an example embodiment, other nodes associated with node 214 may be connected to example node 214. In navigation section 206 one can see there is an example node 216 that is related to example nodes 214 and 220. Example node 216 may be books related to Harry Potter and example node 220 may be a group of characters associated with Harry Potter. Similarly, example node 218 is an actual book and thus related to example node 216 "Harry Potter Books."

Along with the node data like node text, different visual attributes of the node like node shape, node size, node color, node font, etc., may be defined in the input graph data. In some example embodiments, a node shape may be a circle, ellipse or rectangle. The size of the node may be specified at each of the zoom levels. In the context of a circle node, size may indicate the radius of the node. The size of a node in the graph may denote the importance of the node relative to other nodes. For example the size of a node may indicate the number of search queries occurring at that node. Other properties of the node like node color may indicate special semantic meaning as specified by the application server 110. For example, the color may relate to a category.

In an example embodiment, a user may navigate the map like a traditional online geographic map because each of the nodes has been assigned Cartesian coordinates. In an example embodiment, panning and semantic zooming are allowed in the navigation section 206. Panning may allow a user to explore the graph incrementally by moving from one sub-region of the map to the another sub-region. In an example embodiment, the nodes have fixed relative coordinates. Semantic zooming may allow a user to see more detailed levels of information at different zoom levels. For example, analogizing to a traditional map, the application server 110 may maintain different views at a street, city, and state level. In the context of the map of search queries, the server 110 achieves semantic zooming by maintaining nodes and edges at different zoom levels. At a lower zoom level more important nodes and their edges are defined where as we approach higher zoom level the graph becomes more detailed and dense. Different image files for the graph may be generated and maintained at the application server to enable semantic zooming. The number of zoom levels may change depending upon the intended use and may be configured in the application server 110.

Item listings section 208 may display listings 210 related to the search queries displayed in the navigation section 206. In some example embodiments, the listings 210 may be items for sale through an online auction site. There may also be a "more" control 211 that allows a user to see more listings 210. In an example embodiment, overview map 212 displays an overview of a map. In some example embodiments, the overview map 212 is less detailed than navigation section 206. For example, it may only display top level nodes such as example node 214 with no connections. Box 213 may indicate to a user what portion of the map the user is currently viewing navigation section 206.

Figure 3:
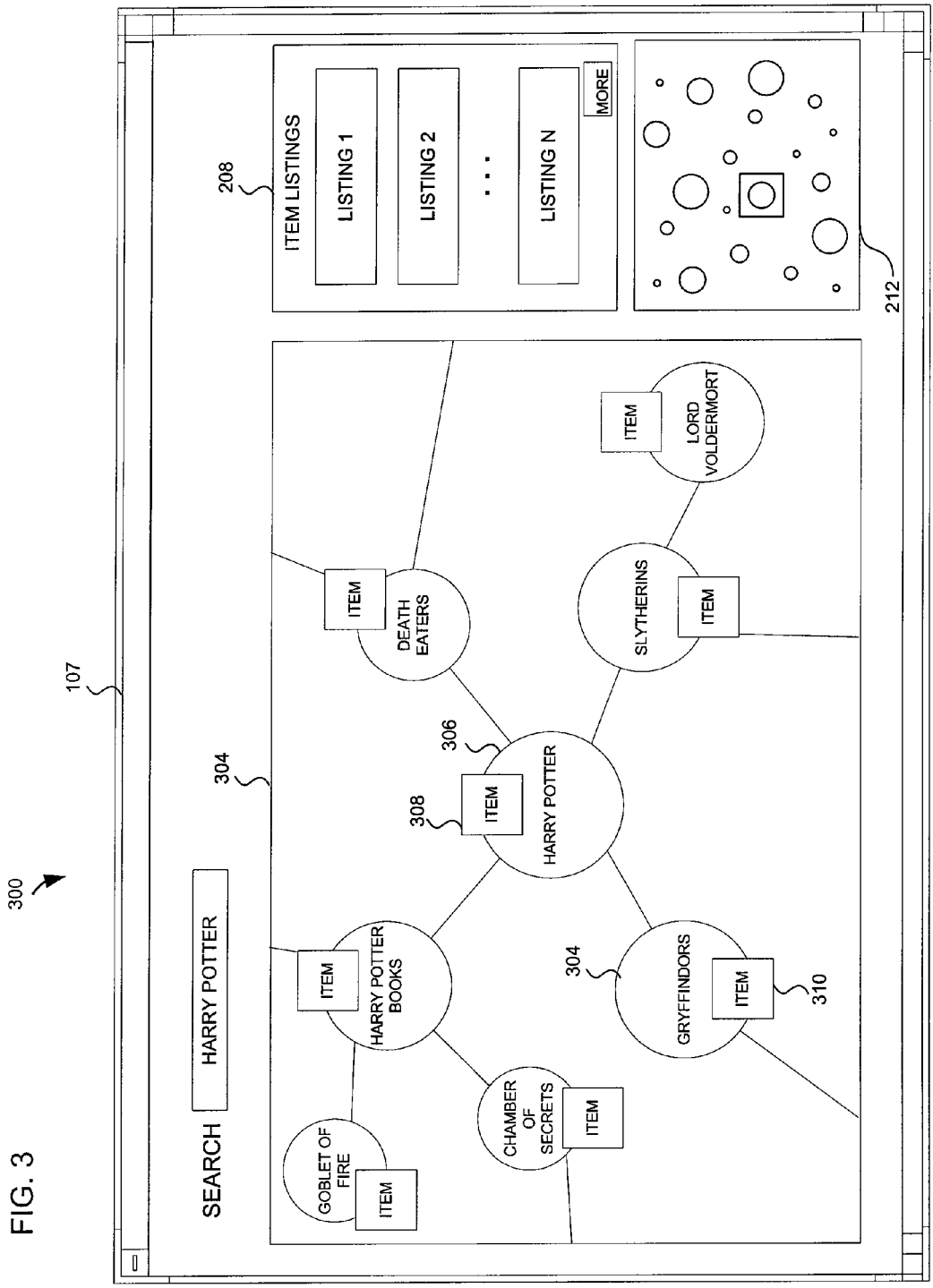

FIG. 3 is an example user interface that a user may use to navigate the map. In an example embodiment, the navigation section 304 may display example nodes 304 and 306. In an example embodiment, these nodes may have associated items 308 and 310, respectively. The items may be items that are for sale on an auction site. They also may be a representative picture of the item such that item 308 displays a picture of Harry Potter. The items 308 and 310 may also be linked to listings displayed in the item listings section 208.

Figure 4:
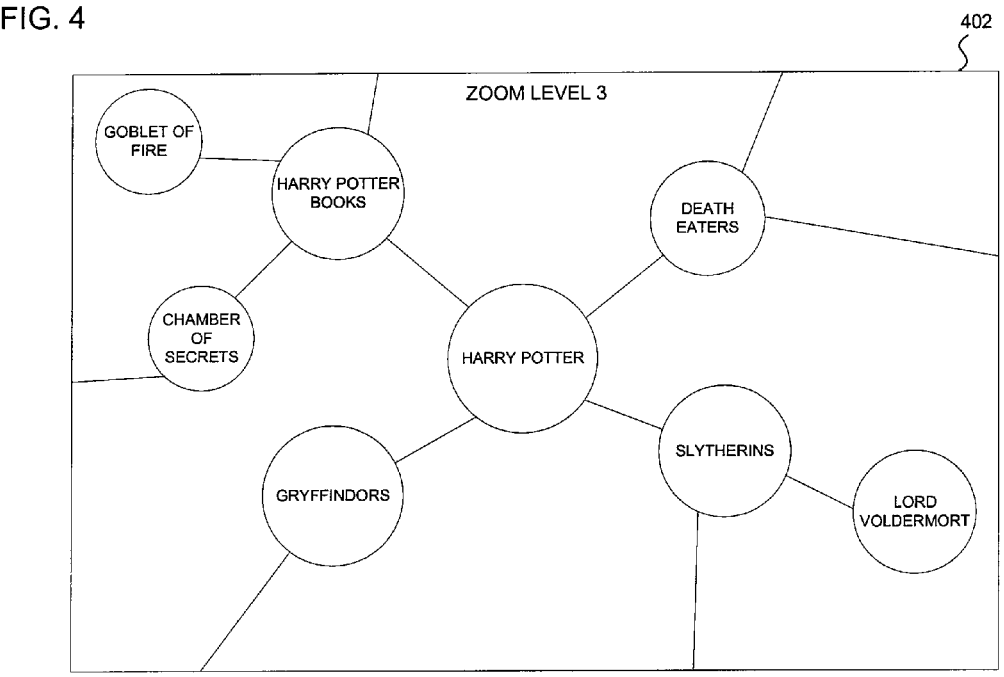
FIGS. 4-5 are example graph layout views, according to various example embodiments.
Figure 5:
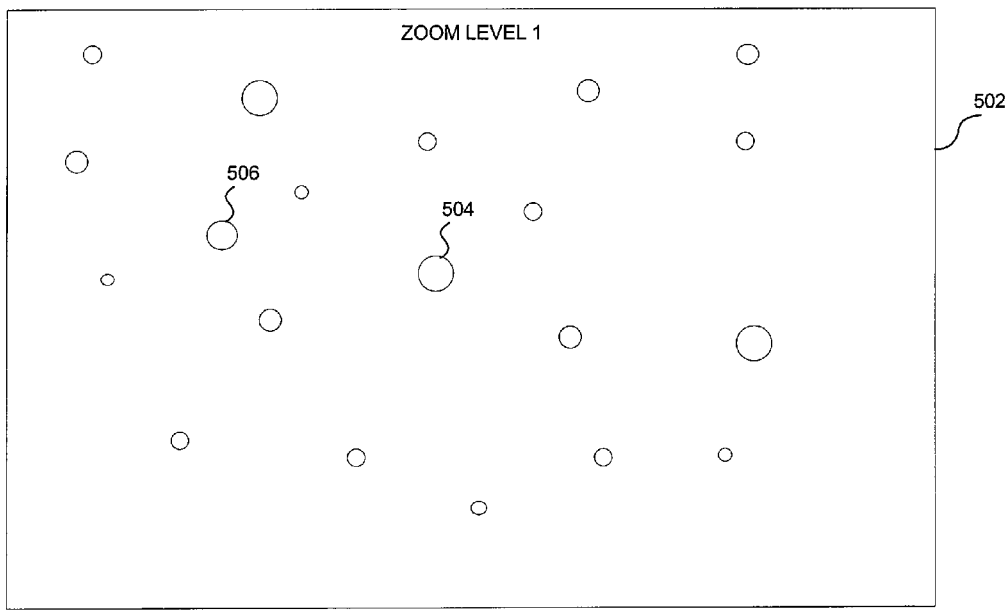

FIGS. 4 and 5 are example maps of the search queries viewed at different zoom levels. In some example embodiments, three zoom levels are defined. For example, map views for each of the zoom levels may be defined in the following way. First, at zoom level 1 the top 100 search queries are displayed at their positions as shown in FIG. 5. In an example embodiment, at this zoom level, the edges are not displayed which may improve the readability and comprehensibility of the graph. Various top search query nodes 504, 506 are illustrated in an example map 502. At zoom level 2, when a user zooms in at a node or a region in the graph, we may show the important nodes around the selected node. FIG. 4. shows a map 402 using a zoom level 3 of the graph where we may show a more detailed layout of the nodes around the selected or zoomed node.

Figure 6:
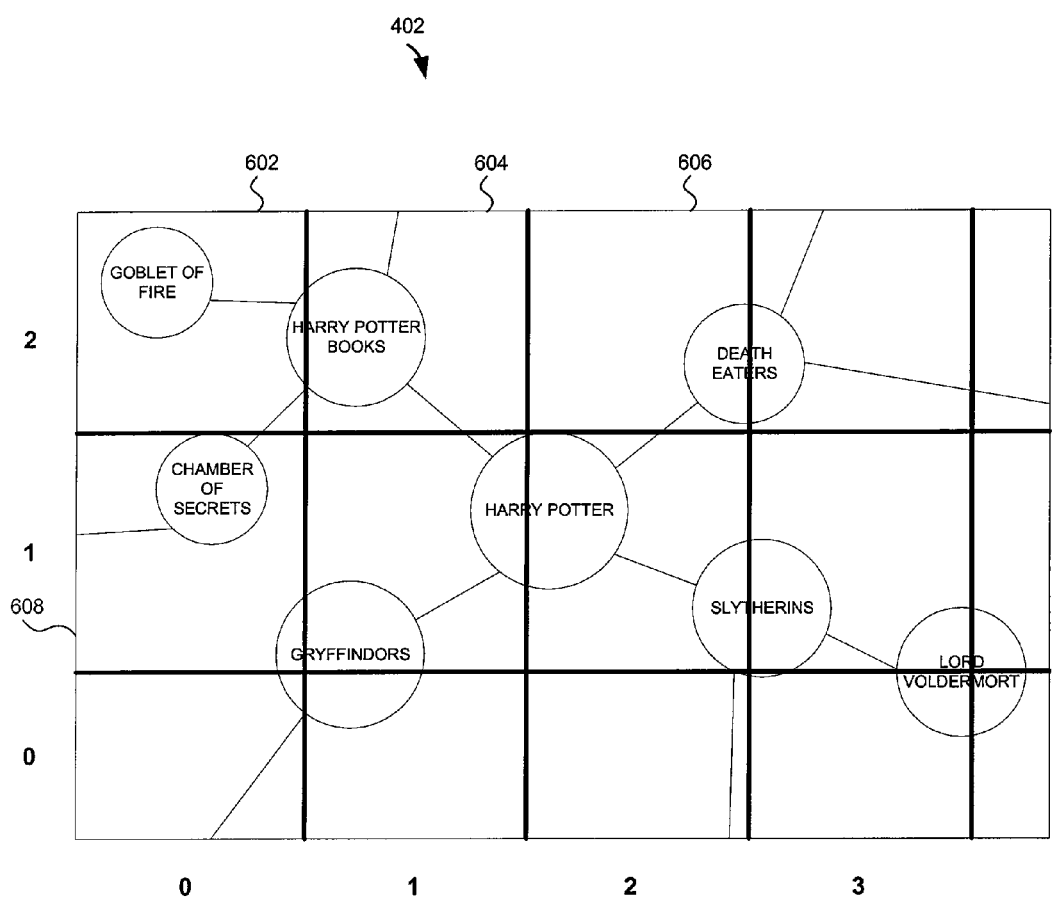
FIG. 6 is an diagram illustrating graph layout tiles, according to an example embodiment.

In another example embodiment, there may be an alternative view at zoom level 1 where instead of maintaining the search queries over all categories, a separate map within each category may be maintained. For example, the zoom level 1 view may be split into 16 categories (or any other defined number of categories). The graph data and rendering of the categories may be performed in the same way except that the boundaries of the categories may be defined manually depending on the size of the graph within each category. Each category may be regarded as a state or a region users can delve in to see more details FIG. 6 is an example depiction of image tiles that may be generated from the map 402. As described above, the user receives a series of image tile files for a given node. In order to facilitate this process the map may be divided into a series of tiles. Each tile in the grid may be numbered in the form of x and y coordinates as shown in the FIG. 6: tile 602 (0, 2), tile 604 (1, 2), tile 606 (2, 2), and tile 608 (0, 1). At each of the zoom levels, the map may be divided into a different set of tiles. The tile size and overall layout size may be provided as parameters which may be configured in the application server.

Figure 7:
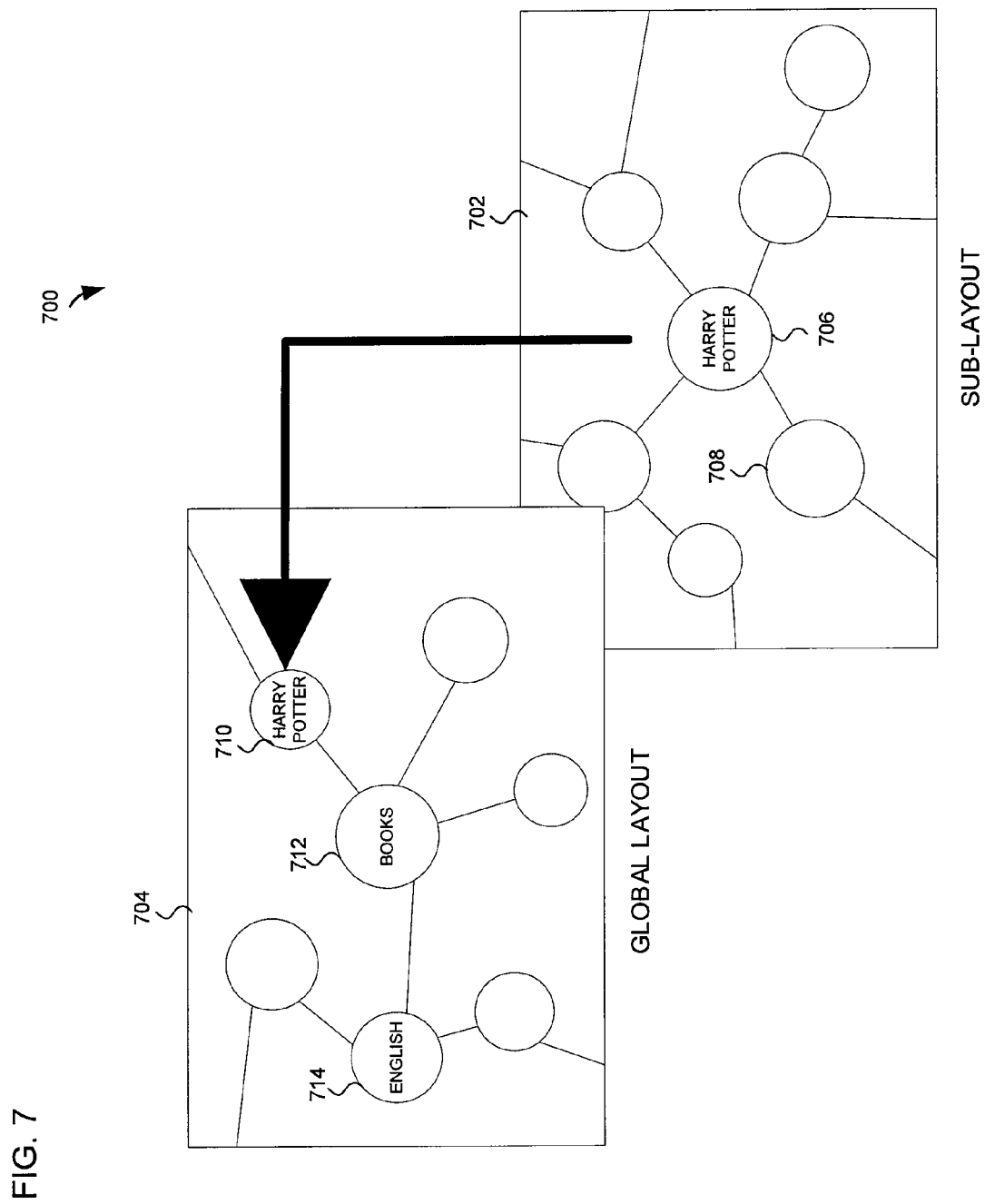
FIG. 7 is an example illustration of a layout and a sub-layout according to an example embodiment.

FIG. 7. is an example illustration 700 of a sub-layout 702 and a global layout 704. In an example embodiment, the sub-layouts are not rendered into images, but stored internally on the application server. In some example embodiments, the global layout defines the Cartesian coordinates of each search query that is ultimately displayed in the map. The sub-layouts may be used in order to reduced the computational overhead involved. In an example embodiment, the global layout 704 has many top level nodes 710, 712, and 714. The top level nodes may correspond to the global graph top level nodes as defined in the graph data. In some example embodiments each top level node has an associated sub-layout. In example 700, the top level node 710 "Harry Potter" has the associated sub-layout 702. The sub-layout may have many sub-nodes (e.g., example sub-node 708). Nodes and a sub-nodes may be considered structurally equivalent. In the example embodiments discussed a sub-node simply means a node within a sub-layout. The sub-nodes may correspond to nodes in sub-graphs as defined in the graph data.

Figure 8:
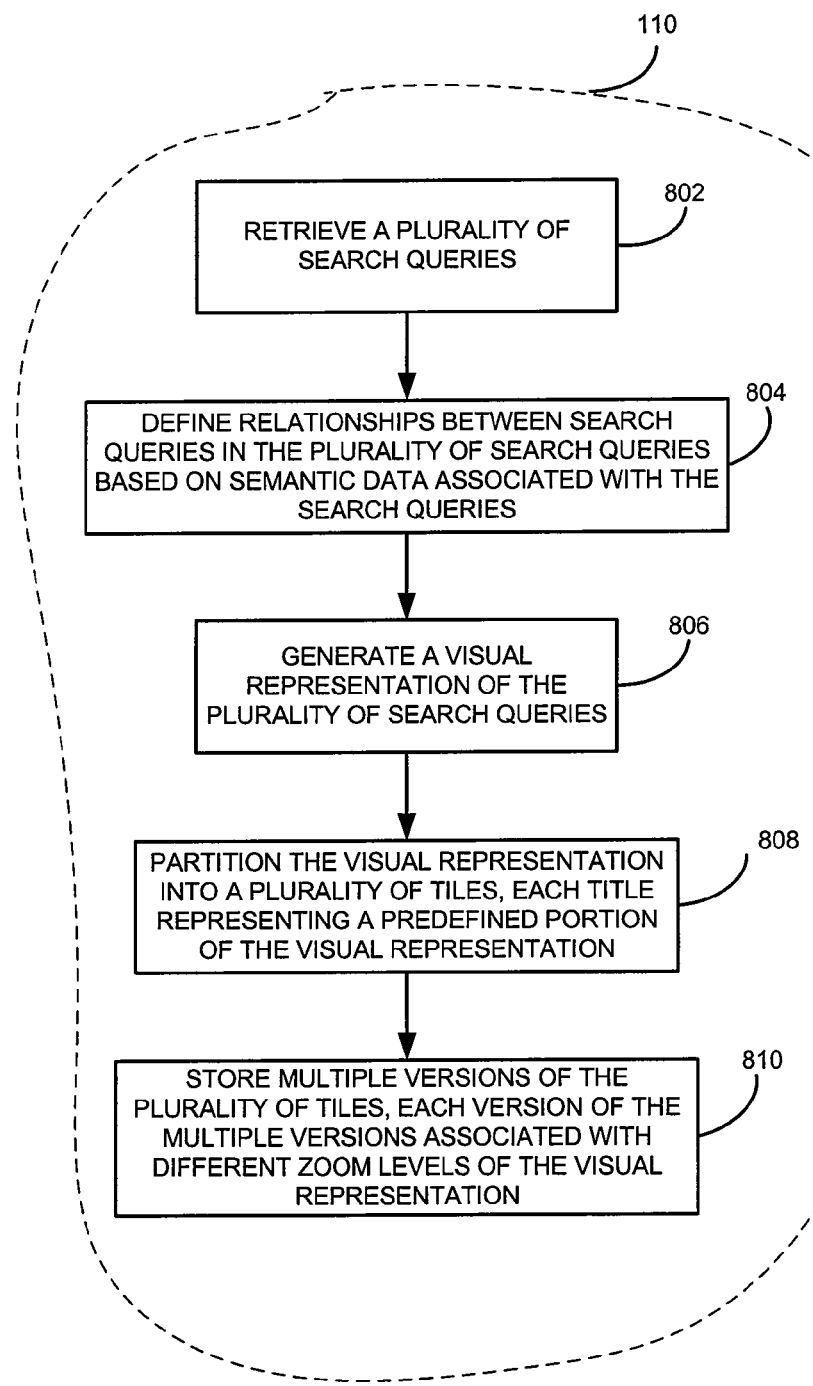
FIG. 8 is a flowchart illustrating a method, according to an example embodiment, to construct a graph layout from graph data according to an example embodiment.

FIG. 8 is a flowchart 800 illustrating an example method to construct a map from search queries according to an example embodiment. The steps described in flowchart may be implemented using an application server 110 as illustrated in FIG. 1.

At block 802, in an example embodiment, a plurality of search queries may be retrieved. In some example embodiments item listing data is also retrieved. In an example embodiment, the item listing data is entered by sellers of various items and may constitute an image, title, category and description of an item they would like to sell. Sellers may use the title of the item to summarize the item. There may be many different items for sale at any given time. Example titles may include "7×10 FINE PERSIAN TABRIZ DESIGN ORIENTAL WOOL AREA RUG" or "APPLE IPOD 4 GB WHITE NANO 1st GENERATION 1 DAY AUCTION." The application server 110 may also collect search result data from previously conducted search queries. For example, when a user searches using a search query the search results may be computed using multiple factors including item titles. There may be thousands of search results for any single search query. For example, a search query "new york" may have 70,000 search results. In some example embodiments, a node that is displayed in the map may be a search query or portions of an item listing title.

Figures 9, 10:
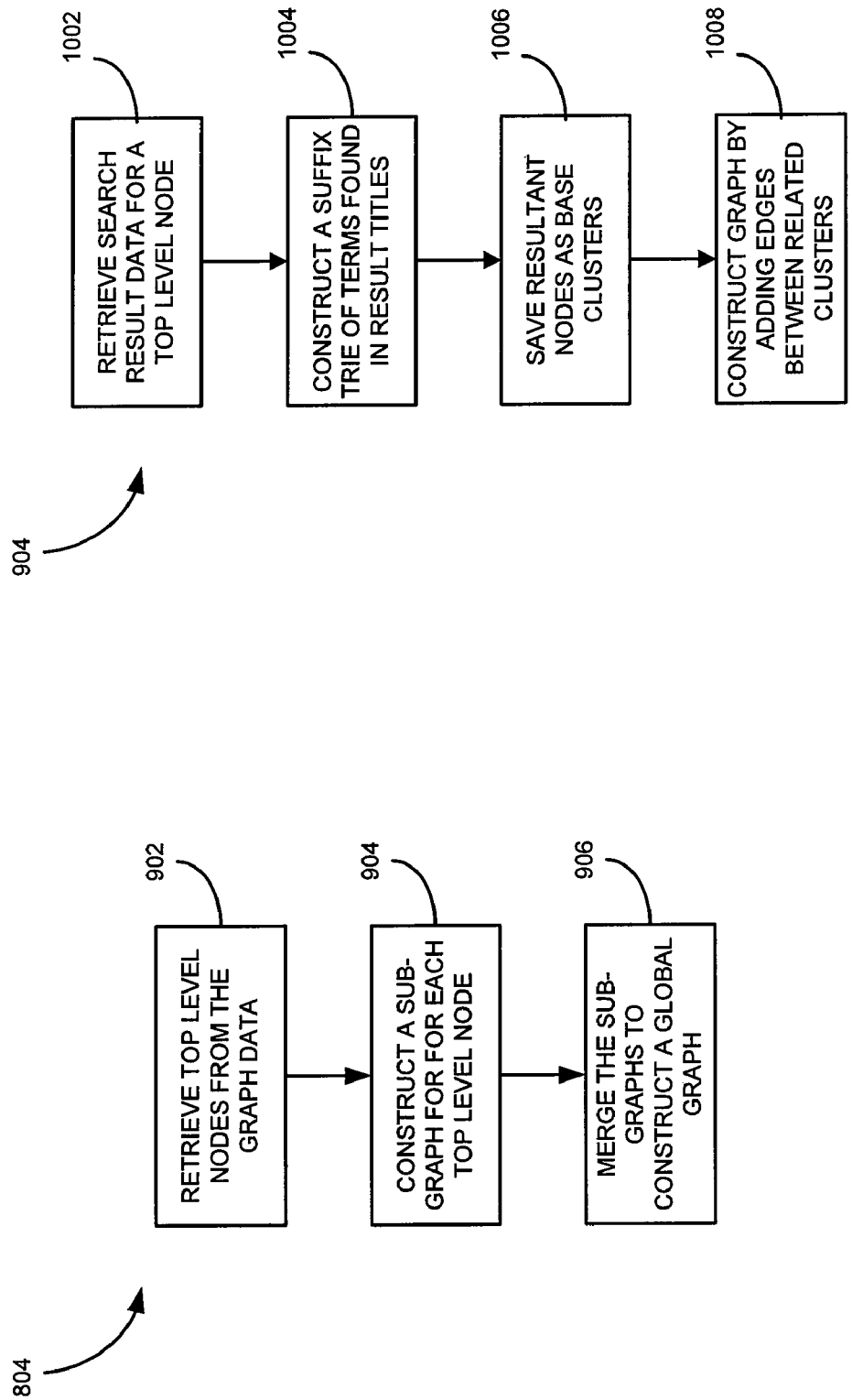
FIG. 9 is a flowchart illustrating an example embodiment to construct a global graph.
FIG. 10 is a flowchart illustrating an example method to construct a sub-graph, according to an example embodiment.

At block 804, in an example embodiment, relationships between search queries in the plurality of search queries are defined based on semantic data associated with the search queries. In an example embodiment, the semantic data includes a portion of an attribute shared by a first search query and a second search query. For example, the attribute might be a category (e.g, book). In some embodiments, the attribute may be the commonality of terms appearing together in search queries. For a given search query, one may group the search results into clusters and a sub-graph may be constructed depicting the relationships between these search result clusters. Then one may generalize this over the top search queries e.g., construct multiple sub-graphs, one for each of the top search queries. One may use these sub-graphs to find the relationships between the top search queries and construct a global graph. An example method to defined the relationships between search queries is illustrated in FIG. 9.

At block 806, in an example embodiment, a visual representation of the plurality of search queries may be generated. In an example embodiment the layout of the search queries displayed in the map are defined by using a multi force directed layout algorithm. This may allow an aesthetically looking layout of the nodes (search queries) and edges. In an example embodiment, using a force directed layout algorithm considers the force between any two nodes and minimizes the energy of the system by moving the nodes and changing the forces between them. This layout algorithm may be useful for visualizing very large undirected networks (e.g., the graph data) and may guarantee that topologically near nodes are placed in the same vicinity, and far nodes are placed far from each other. Because some force directed layout algorithms cannot handle large graphs due to the time complexity, one may use the multi-scale force directed layout algorithm using force directed layout algorithm. In an example embodiment, as the time complexity for computing the layout is high for a large merged graph, the layouts for the global graph and the sub-graphs may be computed individually and then merged. In an example embodiment, generating the visual representation of the plurality of search queries includes generating edges between representations of search queries based on the relationships between queries of the plurality of search queries.

At block 808, in an example embodiment, the visual representation may be partitioned into a plurality of tiles, each tile representing a predefined portion of the visual representation, as shown in FIG. 6. In some example embodiments the tile size may be set ahead of time. The visual representation may be split into the plurality of tiles according to the tile size. In some embodiments, at least one query of the plurality of search queries located within each of the plurality of tiles is determined. Scaled vector graphic (SVG) data for the at least one query of the plurality of search queries may be generated.

In example embodiments, each tile may have an associated coordinate. In an example embodiment, different zoom levels have different sized tiles. In an example embodiment, the plurality of tiles may be rendered. In an example embodiment, the tiles may rendered into image files that are stored on the application server 110. The image files may then be transmitted to a user device when requested. In a further example embodiment, the tiles may be rendered on the user device in real-time. In an example embodiment, the nodes and edges of the graph are rendered using the graphics language Scaled Vector Graphics (SVG). The position information of the nodes and the visual attributes of the node may be represented in SVG which may then be viewed using a browser and external viewers. Images generated from SVG may be stored in the application server 110. In one example embodiment, a single SVG file is generated for the whole graph which may be partitioned into several image tile files (e.g., images the same size as the tiles).

At block 810, in an example embodiment, multiple versions of the plurality of tiles are stored, each version of the multiple versions associated with different zoom levels of the visual representation. In an example embodiment, metadata defining rendering characteristics of the plurality of search queries may be retrieved, the rendering characteristics including a characteristic defining how to render the plurality of search queries at each zoom level, the rendering of the search queries differing at different zoom levels. As described above, a node may take on different shapes, colors, or sizes based on the metadata and zoom level.

FIG. 9 is a flowchart 804 that describes an example method to define relationships between the search queries. At block 902, in an example embodiment, the top level nodes may be retrieved from the graph data representing a predefined number of search queries. In an example embodiment, all the search queries from the users are ranked by the number of times the search query is performed. Top search queries may constitute important concepts in the data as these queries are the most frequently used terms by potential buyers to search for items. For example here are few sample top search queries that may exist at an auction site, "nintendo wii", "xbox 360", "harry potter", "ipod", "coach", "playstation 3", "psp", "coach", and "ipod nano." In an example embodiment, the top 10,000 search queries are considered top level nodes.

At block 904, in an example embodiment, a sub-graph may be constructed for each top level node. An example method to construct a sub-graph is discussed in further detail with reference to FIG. 10.

At block 906, in an example embodiment, the sub-graphs may be merged to construct the global graph. An example method to merge the sub-graphs to construct a global graph is discussed in further detail with reference to FIG. 13.

FIG. 10 is a flowchart 904 illustrating an example method to construct a sub-graph. At block 1002, the search result data may be retrieved for a top level node. The search result data may include the item listings that result from a search if the top level node is used as a search query. For example, if the top level node was "Harry Potter" the search result data would include item listings related to Harry Potter.

At block 1004, a suffix tree may be constructed of the resulting titles in the search result data. For example, to construct the sub-graph around the top level node "pepsi cola," all the titles from item listings resulting from searching using "pepsi cola" may be clustered using a suffix tree. A suffix tree clustering algorithm may involve building a suffix tree of the terms in documents (e.g., item listings) that are to be divided into groups of clusters based upon the commonality of phrases in the documents.

Figure 11:
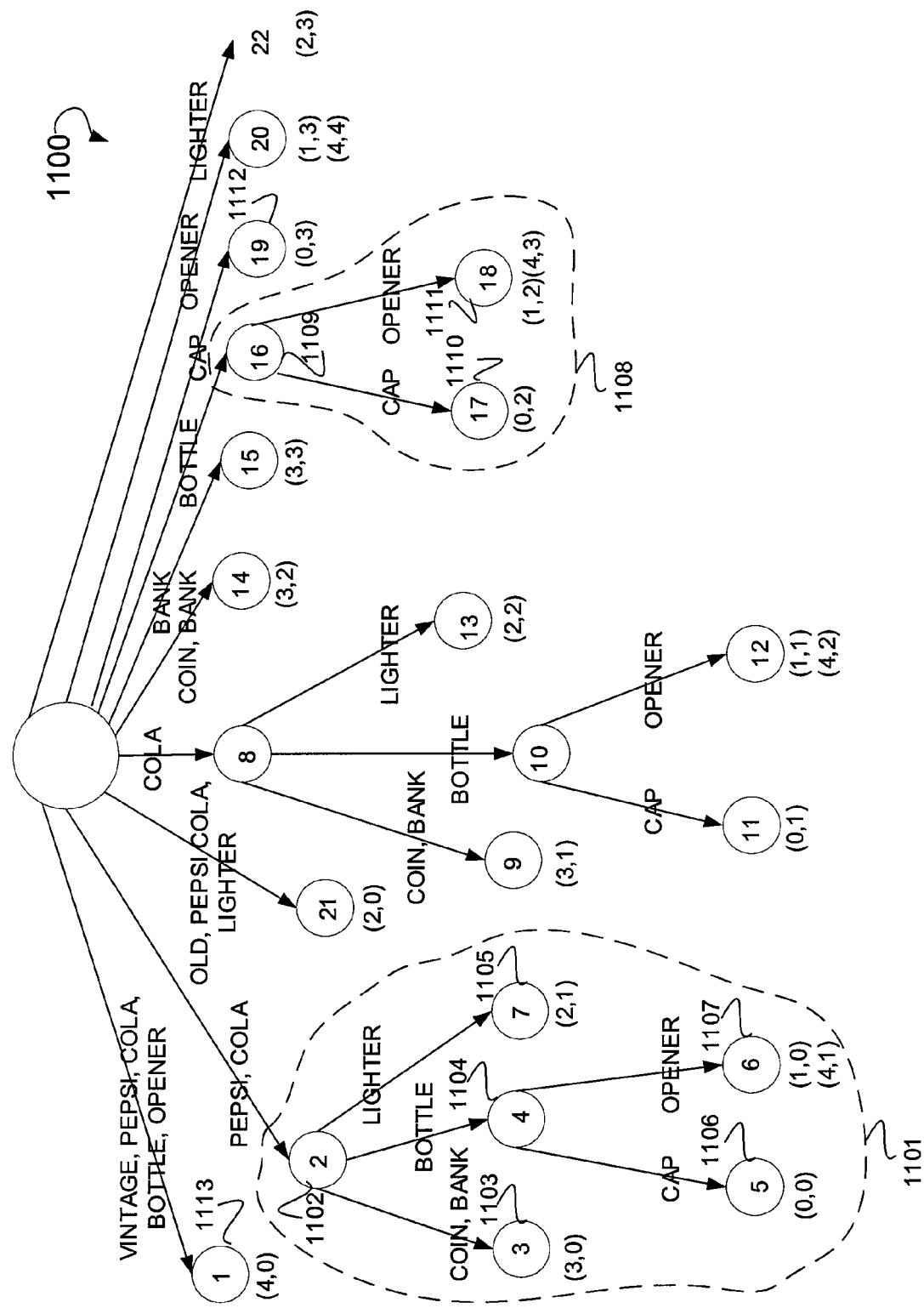
FIG. 11 illustrates a suffix tree, according to an example embodiment.

For example, FIG. 11 shows how an example compacted suffix tree 1100 constructed using the item titles of the following five example listings "Pepsi Cola", "Pepsi Cola Bottle Opener", "Old Pepsi Cola Lighter", "Pepsi Cola Coin Bank", "Vintage Pepsi Cola Bottle Opener." This compacted suffix tree 1100 may have a number of properties. These properties include, for example, that each node in the compacted suffix tree represents a base cluster of documents generated through applying some type of logical operation (e.g., union, intersection, etc.) to eliminate duplicate substrings such that no two edges of the same node are labeled with strings or substrings beginning with the same words. A further property of this compacted suffix tree 1100 may be that the path from a leaf node to the root node, and the edges along this path, may be combined to form a string or substring. Illustrated is a subtree 1101, wherein a node 2 referenced as 1102 is linked to a node 3 referenced as 1103 such that the edge connecting node 2 and node 3 generates the substring "Coin Bank." Further, connected to the node 2, referenced as 1102, is a node 4 referenced as 1104 where an edge labeled "Bottle" connects node 2 and node 4. Moreover, a node 7 referenced as 1105 is also connected to the node 2 referenced as 1102 via an edge labeled as "Lighter." Node 3 referenced as 1103 is a leaf node, such that documents 3 and 0 include the substring "Pepsi Cola Coin Bank." Similarly, node 7 referenced as 1105 is also a leaf node such that documents 2 and 1 include the substring "Pepsi Cola Lighter." Connected to the node 4 referenced as 1104 is a further node 5 referenced as 1106 wherein node 4 and node 5 are connected with an edge labeled with the substring "Cap." Also connected to the node 4 referenced as 1104 is a node 6 referenced as 1107 wherein the edge connecting node 4 referenced as 1104 and node 6 referenced as 1107 is an edge labeled with a substring "Opener." Node 5 referenced as 1106 is a leaf node such that document 0 includes the substring "Pepsi Cola Bottle Cap." Also, node 6 referenced as 1107 is a leaf node such that documents 0, 1, and 4 include the substring "Pepsi Cola Bottle Opener." Compacted suffix tree 1100 includes a number of other subtrees. For example, a subtree 1108 is also illustrated wherein this subtree 1108 includes a node 16 referenced as 1109. This node 16 referenced as 1109 is connected to a node 17 referenced as 1110 and a node 18 referenced as 1111. Node 17 referenced as 1110 is a leaf node, such that documents 0 and 2 include the substring "Bottle Cap." Further, node 18 referenced as 1111 is also a leaf node such that documents 1, 2, 3, and 4 include the substring "Bottle Opener."

In some example embodiments, not only may a plurality of nodes make up a subtree, but also a singular node may make up a subtree. For example, node 19 referenced as 1112 is connected to the root node via an edge labeled "Cap," such that documents 0 and 3 include the substring "Cap." Further, the node 1 referenced as 1113 is a leaf node that references documents 0 and 4, such that documents 0 and 4 include the substring "Vintage Pepsi Cola Bottle Opener."

At block 1006, the resultant nodes may be used as base clusters. At block 1008, the graph may be constructed by adding edges between related clusters.

Figure 12:
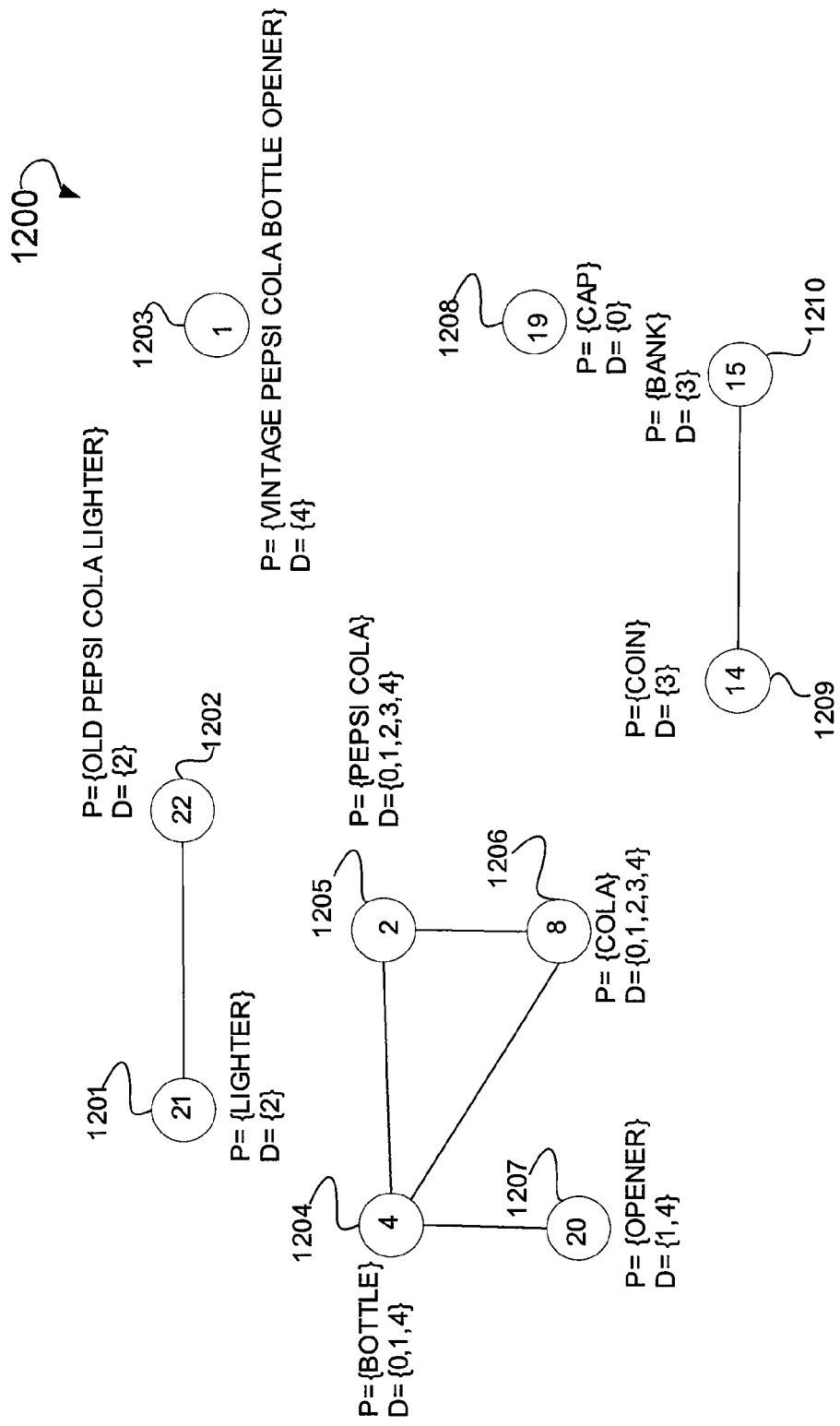
FIG. 12 illustrates an example merged cluster map, according to an example embodiment.

FIG. 12 is an example merger cluster map that may result from the combining of clusters at block 1006. Illustrated is a merged cluster map 1200 where nodes are merged together based upon some type of predefined overlap value (e.g., 50%). This merging may be effectuated by, for example, using any one of a number of logical operations such as, for example, union, intersection, etc. Illustrated is a node 21 referenced as 1201 that is connected bi-directionally to a node 22 labeled as 1202. This node 21 references the substring "Lighter" and the document that includes the substring "Lighter" which, in this case, is document 2. Node 22 references the substring "Old Pepsi Cola Lighter" wherein the substring is included also in document 2. Also illustrated is a node 1 referenced as 1203 that roughly corresponds to nodes 1113. This node has no edges and represents, for example, the substring "Vintage Pepsi Cola Bottle Opener" as it may appear in, for example, document 4. Also illustrated is a node 4 referenced as 1204 that is connected to a number of other nodes via edges. For example, a node 20 referenced as 1207 is connected to node 4 via a bidirectional edge, such that the substring "Bottle Opener" may be generated via the edge connecting node 4 (e.g., 1204) and node 20 (e.g., 1207). The substring "Bottle" associated with node 4 may be included in documents 0, 1, and 4. The substring opener associated with node 20 may be included in documents 1 and 4. Also connected to node 4 (e.g., 1204) is a node 2 referenced as 1205 and a node 8 referenced as 1206. With regard to node 2, a substring "Pepsi Cola" is associated with this node 2 wherein the substring is included in documents 0, 1, 2, 3, and 4. Associated with node 8 is a substring "Cola" that is included in documents 0, 1, 2, 3, and 4. Additionally illustrated is a node 19 referenced as 1208 that roughly corresponds to nodes 1112. Associated with this node 19 is the substring "Cap" which may appear in, for example, document 0. Further illustrated is a node 14 referenced as 1209 and node 15 referenced as 1210 wherein this node 14 and 15 are connected to a bidirectional edge. Associated with node 14 is the substring "Coin" that may appear in, for example, document 3, whereas associated with node 15 is the substring "Bank" that may be included in document 3.

In some example embodiments, bidirectional edges are used to connect the various nodes that make up this merged cluster map. In one case, the use of bidirectional edges denotes that the substrings or a combination of substrings may be searched or understood bi-directionally such that the substring "Old Pepsi Cola Lighter" may be held as an equivalent to "Lighter Cola Pepsi Old" for the purposes of searching and retrieving search results. Moreover, in certain cases, an overlap value may be based upon some percentile value wherein, for example, where there is a 50% overlap in documents including strings or substrings, then the nodes that reference these strings or substrings may be merged with other nodes including similar (e.g., at least 50% similar) similarity. In addition to a bare overlap value, additional factors such as a relevancy weighting factor, a seller factor, a price factor, a category factor, an image factor or some other suitable factor may be used as a basis for merging clusters. Further, these clusters are built purely based on the title text. For example, one may use price information as an additional parameter into the clustering system, such that clusters that are closer to each other in the price range might contribute as additional factor for merging criteria.

Further details regarding constructing suffix trees and clustering for search results may be found in U.S. patent application Ser. No. 11/771,464, entitled "SEARCH CLUSTERING," field on Jun. 29, 2007, the contents of which are hereby incorporated by reference for all purposes.

Figure 13:
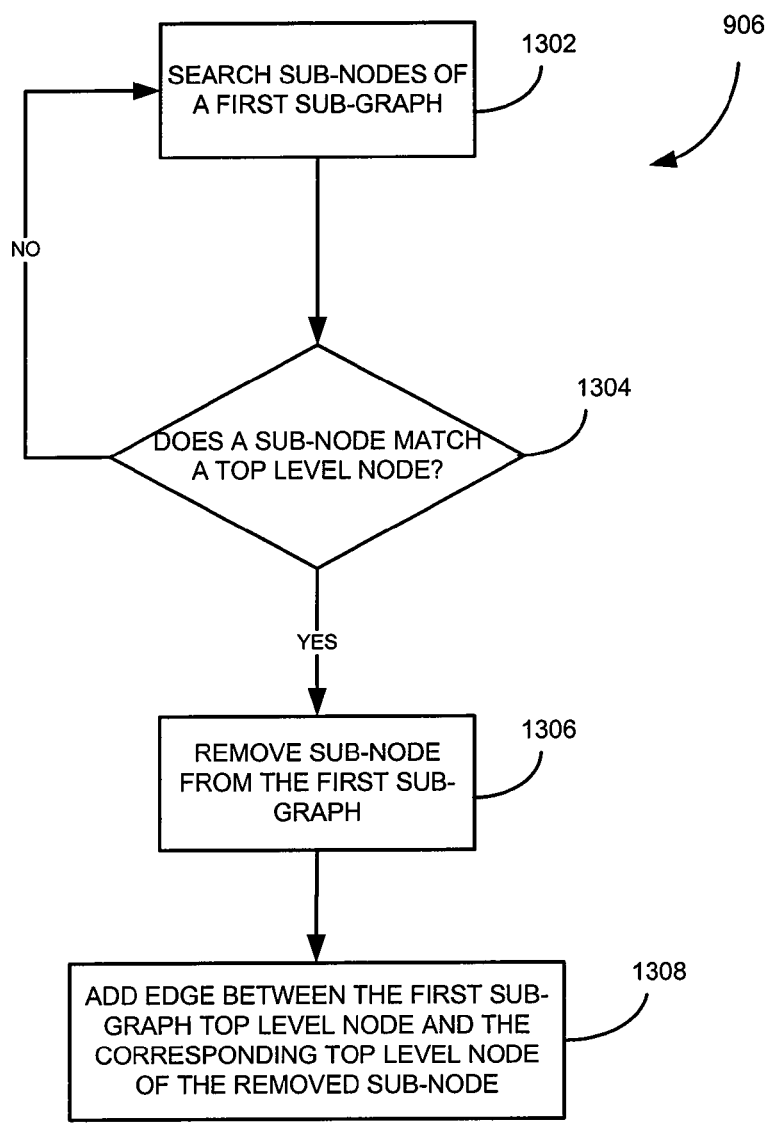
FIG. 13. illustrates an example flowchart illustrating a method, according to an example embodiment, to merge sub-graphs into a global graph.

FIG. 13. illustrates an example flowchart 906 illustrating a method to merge the sub-graphs into a global graph. A sub-graph may be considered an independent graph including its own nodes which may sometimes duplicate top level nodes or nodes within other sub-graphs.

At block 1302, in an example embodiment, the sub-nodes of a sub-graph are searched. A sub-node denotes a node within a sub-graph. At block 1304, in an example embodiment, it is determined whether or not a sub-node matches a top level node. For example both "ipod" and "ipod nano" may be top level nodes and have individual sub-graphs. If there exists a node "ipod" in the "ipod nano" sub-graph it may be considered a match. If it determined the sub-node does not match a top level node then control returns back to block 1302 to retrieve another sub-node.

At block 1306, in an example embodiment, it is determined that a sub-node matches a top level node and the sub-node is removed from the sub-graph. Using the example above, the node "ipod" would be removed from the "ipod nano" sub-graph.

At block 1308, in an example embodiment, an edge is added between the sub-graph's root node (e.g., the top level node to which the sub-node belongs) and the matching top level node. Continuing the above example, an edge may be added from "ipod nano" to "ipod" at the top level node of the graph. In this way the global graph may be constructed such that there are defined relations between the top level nodes.

FIG. 14 illustrates an example flowchart 806 illustrating a method generate a visual representation of the plurality of search queries. At block 1402, in an example embodiment, a layout algorithm may be applied to the top level nodes in the global graph. At block 1404, the top level nodes may be assigned positions (e.g., Cartesian coordinates) relative to the global graph. A force directed layout algorithm may be used on the top level nodes to determine the relative layout of the top level nodes. The positions of the resultant top level node graph may range from 0,0 to 300000,300000. The range described is only exemplary, and other ranges may be used as one skilled in the art will recognize.

At block 1406, in an example embodiment, a layout algorithm may be applied to each sub-graph. At block 1408, in an example embodiment, each sub-graphs' nodes may be assigned positions relative to their respective sub-graphs. A force directed layout algorithm may be used to determine the graph layout for each of the sub-graphs. The positions assigned to nodes in each of the sub-graphs are relative to that sub-graph. For example, the positions of the nodes in the sub-graph "ipod nano" may range from 0, 0 to 5000, 5000 while the "disney" sub-graph may have nodes ranging from 0, 0 to 8000, 8000. The ranges described above are only exemplary, and other ranges may be used as one skilled in the art will recognize.

At block 1410, in an example embodiment, the sub-graphs' layouts may be merged into the global graph layout. Given that each of the top level nodes has a relative position in the global graph layout, the sub-graph layouts of the top level nodes may be embedded into the global graph layout. An example method to merge the sub-graph layouts into the global graph layout is described below with reference to FIG. 15.

FIG. 15 illustrates an example flowchart 1410 of a method to merge the sub-graphs' layouts into the global graph layout. At block 1502, in an example embodiment, a top level node's position is retrieved. At block 1504, the positions of the corresponding sub-graph layout's nodes are updated relative to the top level node's position. At block 1506, the sub-graph layout may be embedded at the top level node's position in the global layout. At block 1508, the other top level node's positions in the global layout are updated. In an example embodiment, this will allow the global layout to take into account the embedded sub-graph layout.

In some example embodiments, rendering one SVG file of the entire global layout is computational prohibitive. In an example embodiment, the global layout is broken down into tiles as shown in FIG. 6. In one example embodiment, the tiles are taken and stored as SVG files or rendered image files.

Figure 16:
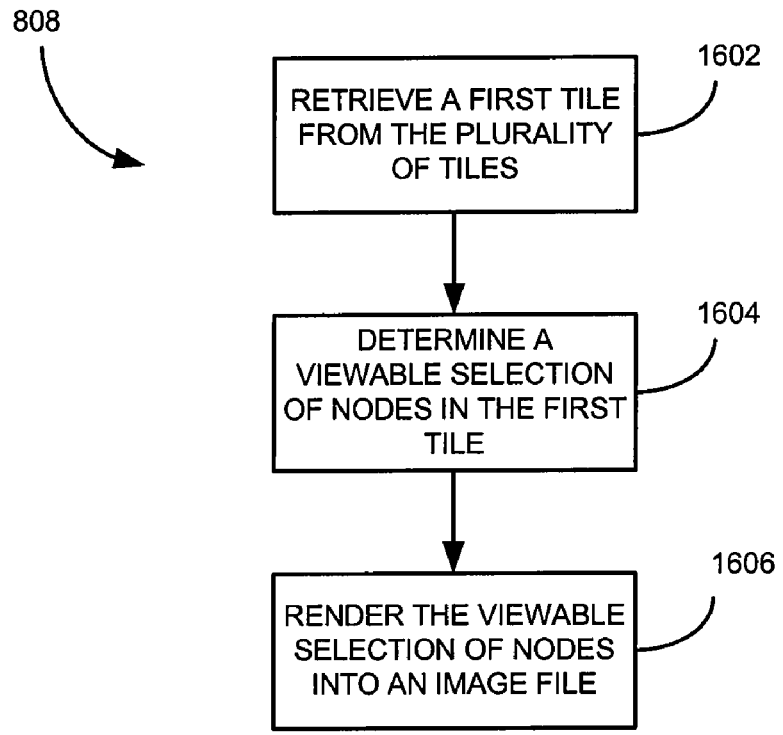
FIG. 16 illustrates an example flowchart illustrating a method, according to an example embodiment, to render a plurality of tiles.

FIG. 16 illustrates an example flowchart 808 illustrating a method to partition the visual representation into a plurality of tiles. At block 1602, in an example embodiment, a first tile may be retrieved from the plurality of tiles. As discussed above a tile may be considered a portion of the visual representation of the search queries. The first tile itself may be defined by coordinates such as (0,0). The coordinates of the tiles may have a different range than the map layout (e.g., FIG. 6). In an example embodiment, nodes having coordinates within the range of (0,0) to (10,10), as defined by the map layout, may be within the first tile (e.g., the tile size is 10×10).

At block 1604, in an example embodiment, a viewable portion of nodes in the first tile may be determined. A viewable portion of nodes may be defined as the set of nodes that are viewable to a user in a tile for a particular zoom level. There may be nodes within the actual range of a tile that are not considered viewable. An example method to find the viewable portion of nodes is discussed below with reference to FIG. 17.

At block 1606, in an example embodiment, the viewable selection of nodes in the first tile may be rendered into an image file. The file may be in the form of a JPG file or defined using the SVG language. In an example embodiment, the image file is stored in the application server 110. The rendering component of the application server may generate (e.g., using the method described in FIG. 16) and store images for each of the zoom levels. Each generated image may be stored using a file name depicting its position and zoom level, Z_X_Y.jpg. For example, to access the graph tile image 300, 300 at zoom level 3 one can access the image using the file name 3_300_300.jpg.

Figure 17:
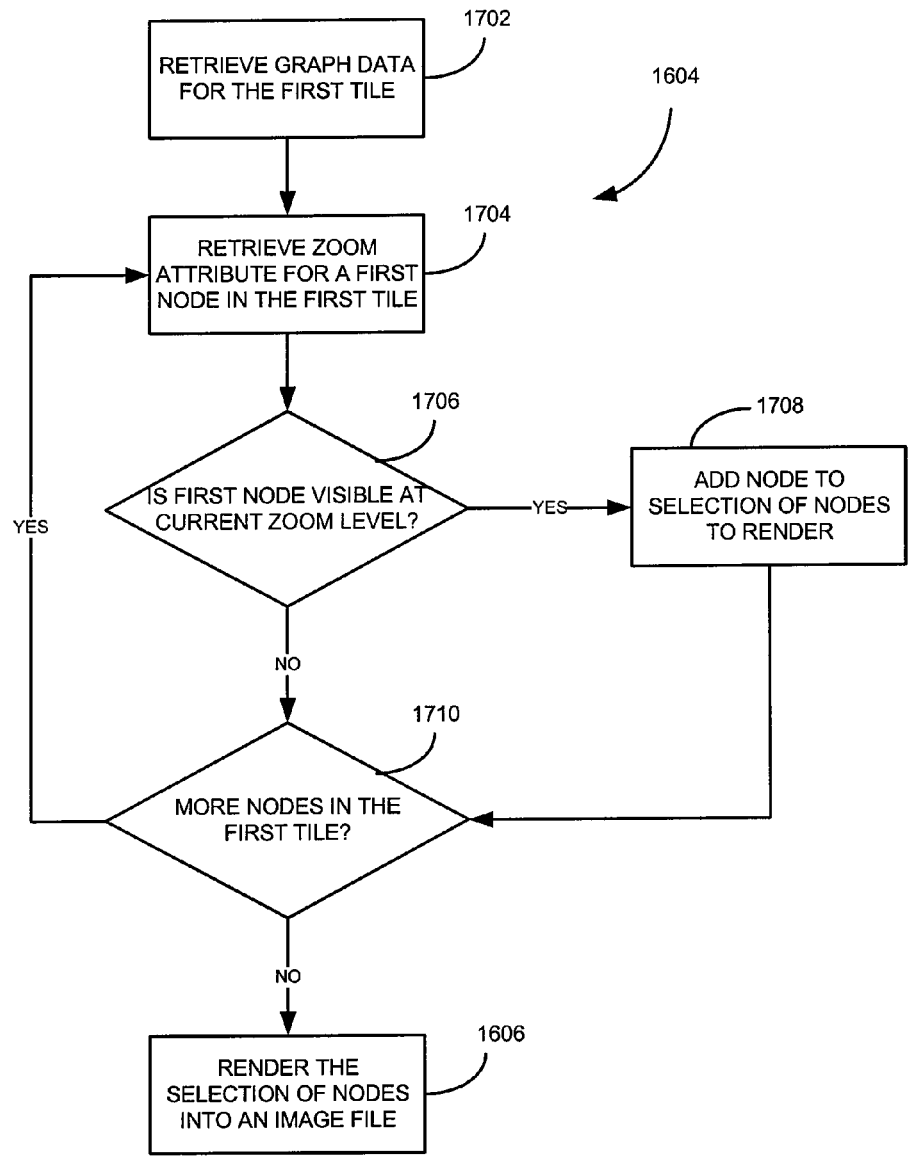
FIG. 17 illustrates a flowchart illustrating a method, according to an example embodiment, to determine a viewable portion of nodes in a tile.

FIG. 17 illustrates a flowchart 1604 illustrating an example method to determine a viewable portion of nodes in a tile. At block 1702, in an example embodiment, graph data for a first tile may be retrieved. The graph data may be the same data that was used to create the layout. In an example embodiment, this data may be stored in XML file. At block 1704, a zoom attribute for a first node in the first tile may be retrieved. At block 1706, in an example embodiment, it is determined whether or not the first node is visible at the current zoom level. In an example, the current zoom level may be level two. If the minLevel attribute is set to three then the first node will not be displayed. However, if the minLevel level is one, than the first node is visible and should be added to the selection of nodes to render at block 1708. At block 1710, in an example embodiment, it is determined if there are more node in the first tile that have not been checked. If there are more nodes to be checked control returns to block 1704.

Figure 18:
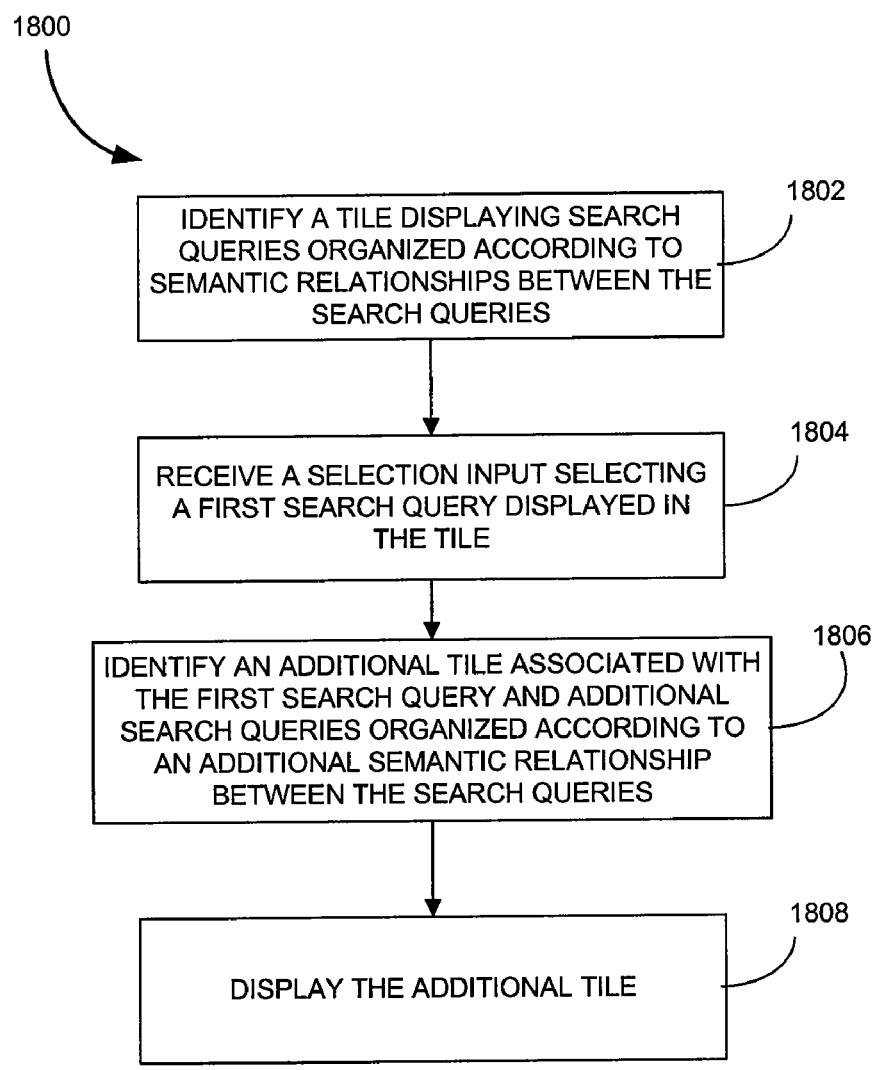
FIG. 18 illustrates a flowchart illustrating an method, according to an example embodiment, for a user to search.

FIG. 18 illustrates a flowchart 1800 illustrating an example method for a user to use the generated visual representation (the map). The following steps will assume the following facts for illustration purposes only: the default zoom level is zoom level 1 and two search queries are used, "Harry Potter" and "Chamber of Secrets." At block 1802, a tile displaying search queries organized according to semantic relationships between the search queries may be identified.

In an example embodiment, a user submits a search query through a user device. The search query may be submitted using a search box such as box 204 in FIG. 2. The search query may be received at an application server. In an example embodiment, the visual representation of the search queries is searched for the starting search query. In an example embodiment it is determined if the search query matches directly to a node in the map. Because in this example, the zoom level is 1, only the top 100 nodes may be displayed on the user device. In an example embodiment, "Harry Potter" is one of the top 100 nodes and "Chamber of Secrets" is not. In an example embodiment, it is determined that the search query matches a node and the starting position may be set to the matched node's position and the image tile may be presented to the user. With the query "Harry Potter" the user device is sent the starting position of the "Harry Potter" node in the map because there is a match at zoom level 1.

In an example embodiment, it is determined that the search query does not match a node in the global layout and the starting position is set to the most relevant node's position. In an example embodiment, when there is not a match at the current zoom level, the application server may search at lower zoom levels to see if the node exists in the global layout. With the "Chamber of Secrets" query the node may be shown at zoom level 3 as illustrated in FIG. 4. In some example embodiments, the application server may change the zoom level and display the first zoom level that the node appears (e.g., zoom level 3). In other embodiments, the position for the matched node is retrieved, but the zoom level is not changed. For example, for the query "Chamber of Secrets" the starting position may be set to the node "Chamber of Secrets," but the user device may display zoom level 1 centered where the node would be displayed had its minLevel parameter been set differently. It may also be possible for the search query to not match any node in the global layout. In an example embodiment, the application server may suggest a starting node based on the terms included in the search query. In some example embodiments, a message to a user may be displayed stating no match could be found.

In an example embodiment, image tile files for the current zoom level and starting position may be retrieved. In an example embodiment, the navigation section displayed on a user device (e.g., navigation section 206) may have many different sizes. In an example embodiment, the number of image tile files retrieved is dependent on the size of the navigation section. For example, if an image tile file is 100 pixels by 100 pixels and the navigation section is 700 pixels wide by 500 pixels tall, 35 tiles will need to be retrieved. As discussed above with reference to block 1606 in FIG. 16, the image tile files may be stored with names descriptive of their location and zoom level. Thus, in an example embodiment, given a starting position as determined by the search query, an image tile file may quickly be retrieved for the currently displayed zoom level, as well as the image tile files surrounding the starting position. In some example embodiments, the image tile files may be transmitted to the user device.

At block 1804, in an example embodiment, selection input selecting a first query displayed in the rile is received. This may be directional input from the user device corresponding to a new position. It may be also including zooming in on the search query. At block 1806, an additional tile associated with the first search query and additional search queries organized according to an additional semantic relationship between the search queries may be identified. At block 1806, the additional tile may be displayed. As discussed above, a user may wish to move around the graph to explore different regions. He or she may also wish to zoom in or out so as to display more or less information about the nodes. For example, suppose a user wishes to move to the right in the graph. The user may use an input device such as a keyboard and press the right arrow key, and this action may be sent to the application server. Other methods of navigation may also be used including, but not limited to, clicking or dragging the displayed images. In an example embodiment, the current position in the global layout may be updated according to predefined rules stored in the application server. For example, a move to the "right" may mean adding 50 to the x-coordinate. Similar changes may be made to the current position based on other movements. In some example embodiments, zooming in does not change the current position, but new image tiles may be retrieved that correspond to the new zoom level. In an example embodiment, an image file representing the additional tile may be retrieved. The addition tile may be transmitted to the user device.

In some example embodiments, image tile files surrounding those currently displayed are retrieved and sent to the user before the current position is changed. In this manner it may be possible for the user to seamlessly move around the graph layout without waiting for the application server to send new image tile files.

Many of the above systems and methods have been described where most of the computational work has been done in the application server. In other embodiments, the user device may take on some, or all, of the functions of the application server. For example, in an example embodiment, the user device may retrieve the SVG files and render the image tile files. In some example embodiments, the user device may retrieve the search result data and construct the graphs and layouts.

Figure 19:
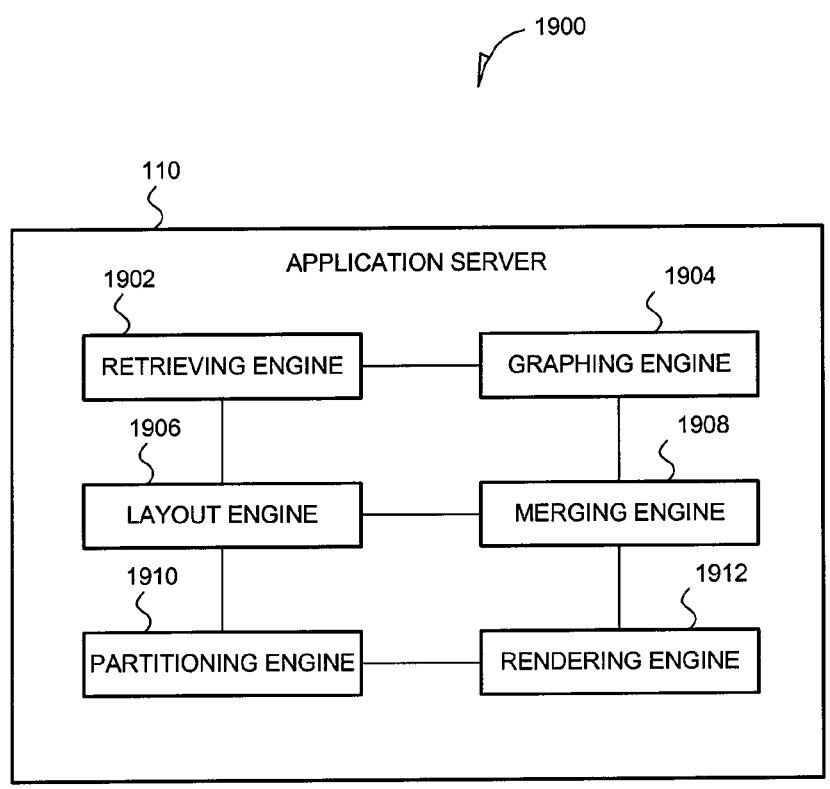
FIG. 19 illustrates a block diagram of an application server according to an example embodiment.

FIG. 19 illustrates a block diagram 1900 of an application server 110. The application server may have one or more engines 1902, 1904, 1906, 1908, 1910, and 1912 communicatively coupled so as to allow communication between all of the engines. In an example embodiment, these engines may implement the systems and methods described above. In an example embodiment, the retrieving engine 1902 may retrieve graph data including a plurality of search queries. The graphing engine 1904 may construct a global graph from the plurality of nodes and construct sub-graphs. The layout engine 1906 may define a global layout by assigning positions to the plurality of nodes and may define sub-layouts. The merging engine 1908 may merge any sub-graphs into the global graph. It may also merge any sub-layouts into the global layout. The partitioning engine 1910 may partition the global layout into a plurality of tiles. The rendering engine 1912 may render the plurality of tiles into a plurality of image tile files.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend or storage tier. These logical/mathematical manipulations may relate to certain business rules or processes that govern the software application as a whole. A third, storage tier, may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above-illustrated tiers, and their processes or operations, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system including a logic component (e.g., a logic tier). These first and second computer systems may be configured in a server-client, peer-to-peer, or some other suitable configuration. These various components may be written using the above illustrated object-oriented programming techniques and can be written in the same programming language or different programming languages. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may utilize the Open Systems Interconnection (OSI) model, or the Transmission Control Protocol/Internet Protocol (TCP/IP) protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

FIG. 20 shows a diagrammatic representation of a machine in the example form of a computer system 2000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 2000 includes a processor 2002 (e.g., a Central Processing Unit (CPU), a Graphics Processing Unit (GPU) or both), a main memory 2004 and a static memory 2006, which communicate with each other via a bus 2008. The computer system 2000 may further include a video display unit 2010 (e.g., a Liquid Crystal Display (LCD) or a Cathode Ray Tube (CRT)). The computer system 2000 may also includes an alphanumeric input device 2012 (e.g., a keyboard), a User Interface (UI) cursor controller (e.g., a mouse), a disc drive unit 2016, a signal generation device 2018 (e.g., a speaker) and a network interface device (e.g., a transmitter) 2020.

The disc drive unit 2016 includes a machine-readable medium 2028 on which is stored one or more sets of instructions 2017 and data structures (e.g., software) embodying or utilized by any one or more of the methodologies or functions illustrated herein. The software may also reside, completely or at least partially, within the main memory 2004 and/or within the processor 2002 during execution thereof by the computer system 2000, the main memory 2004 and the processor 2002 also constituting machine-readable media.

The instructions 2017 may further be transmitted or received over a network (e.g., the INTERNET) 2026 via the network interface device 2020 utilizing any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
    retrieving a plurality of search queries;
    defining relationships between search queries in the plurality of search queries based on semantic data associated with the search queries;
    generating, using at least one processor, a visual representation of the plurality of search queries;
    partitioning the visual representation into a plurality of tiles, each tile representing a predefined portion of the visual representation;
    storing multiple versions of the plurality of tiles, each version of the multiple versions associated with different zoom levels of the visual representation;
    retrieving metadata defining rendering characteristics of the plurality of search queries, the rendering characteristics including a characteristic defining how to render the plurality of search queries at each zoom level of the different zoom levels, the rendering of the search queries differing at the different zoom levels; and
    receiving a selection input selecting a first search query displayed in a tile of the plurality of tiles;
    identifying, using at least one processor, an additional tile associated with the first search query and additional search queries organized according to semantic relationship between the plurality of search queries; and
    transmitting the additional tile to a user device for display.

2. The computer implemented method of claim 1, wherein generating a visual representation of the plurality of search queries includes assigning Cartesian coordinates to the plurality of search queries.

3. The computer implemented method of claim 1, wherein the semantic data includes a portion of an attribute shared by the first search query and a second search query.

4. The computer implanted method of claim 1, wherein generating the visual representation of the plurality of search queries includes generating edges between representations of search queries based on the relationships between queries of the plurality of search queries.

5. The computer implemented method of claim 1, wherein generating the visual representation of the plurality of search queries includes generating an image file.

6. The computer implemented method of claim 1, wherein partitioning the visual representation into a plurality of tiles further includes:
    setting a tile size;
    splitting the visual representation into the plurality of tiles according to the tile size;
    determining at least one query of the plurality of search queries located within each of the plurality of tiles; and
    generating scaled vector graphic data for the at least one query of the plurality of search queries.

7. The computer implemented method of claim 1 wherein the search queries are associated with items for sale and the method further includes:
    displaying items for sale associated with the first search query.

8. The computer implemented method of claim 1 further including:
    receiving a starting search query; and
    searching a visual representation of the search queries for the starting search query.

9. The computer implemented method of claim 1 wherein transmitting the additional tile further includes:
    retrieving an image file representing the additional tile.

10. A system comprising:
    an application server comprising:
        a processor;
        a retrieving engine to retrieve a plurality of search queries;
        a graphing engine to define relationships between search queries in the plurality of search queries based on semantic data associated with the search queries;
        a layout engine to generate a visual representation of the plurality of search queries;
        a partitioning engine to partition the visual representation into a plurality of tiles, each tile representing a predefined portion of the visual representation;
        an image database to store multiple versions of the plurality of tiles, each version of the multiple versions associated with different zoom levels of the visual representation; and
        a second retrieving engine to retrieve metadata defining rendering characteristics of the plurality of search queries, the rendering characteristics including a characteristic defining how to render the plurality of search queries at each zoom level of the different zoom levels, the rendering of the search queries differing at the different zoom levels; and wherein the application server is configured to:
receive a selection input selecting a first search query displayed in a tile of the plurality of tiles;
identify an additional tile associated with the first search query and additional search queries organized according to semantic relationship between the plurality of search queries; and
transmit the additional tile to user device for display.

11. The system of claim 10, wherein the layout engine is configured to generate the visual representation by assigning Cartesian coordinates to the plurality of search queries.

12. A non-transitory machine-readable storage medium having machine executable instructions embedded thereon, which when executed by a processor of a machine, cause the machine to perform operations comprising:
retrieving a plurality of search queries;
defining relationships between search queries in the plurality of search queries based on semantic data associated with the search queries;
generating a visual representation of the plurality of search queries; and
partitioning the visual representation into a plurality of tiles, each tile representing a predefined portion of the visual representation;
storing multiple versions of the plurality of tiles, each version of the multiple versions associated with different zoom levels of the visual representation;
retrieving metadata defining rendering characteristics of the plurality of search queries, the rendering characteristics including a characteristic defining how to render the plurality of search queries at each zoom level of the different zoom levels, the rendering of the search queries differing at the different zoom levels; and
receiving a selection input selecting a first search query displayed in a tile of the plurality of tiles;
identifying, using at least one processor, an additional tile associated with the first search query and additional search queries organized according to semantic relationship between the plurality of search queries; and
transmitting the additional tile to a user device for display.

13. The machine-readable storage medium of claim 12, wherein the generating of the visual representation of the plurality of search queries includes assigning Cartesian coordinates to the plurality of search queries.

14. The machine-readable storage medium of claim 12, wherein the semantic data includes a portion of an attribute shared by the first search query and a second search query.

15. The machine-readable storage medium of claim 12, wherein the generating of the visual representation of the plurality of search queries includes generating edges between representations of search queries based on the relationships between queries of the plurality of search queries.

16. The machine-readable storage medium of claim 12, wherein the generating of the visual representation of the plurality of search queries includes generating an image file.

17. The machine-readable storage medium of claim 12, wherein the partitioning of the visual representation into a plurality of tiles includes:
setting a tile size;
splitting the visual representation into the plurality of tiles according to the tile size;
determining at least one query of the plurality of search queries located within each of the plurality of tiles; and
generating scaled vector graphic data for the at least one query of the plurality of search queries.

* * * * *

UNITED STATES PATENT AND TRADEMARK OFFICE
CERTIFICATE OF CORRECTION

PATENT NO. : 8,326,823 B2
APPLICATION NO. : 12/263390
DATED : December 4, 2012
INVENTOR(S) : Grandhi et al.

It is certified that error appears in the above-identified patent and that said Letters Patent is hereby corrected as shown below:

On the face page, in column 2, under "Other Publications", line 3, delete "2010 IEEE Symposium" and insert --2010, IEEE Symposium,--, therefor On the face page, in column 2, under "Other Publications", line 4, delete "A.;"Embedding" and insert --A.; "Embedding--, therefor On the face page, in column 2, under "Other Publications", line 5, delete "2008." and insert --2008,--, therefor On the face page, in column 2, under "Other Publications", line 9, delete "2006." and insert --2006,--, therefor In the drawings, Sheet 3 of 17, Fig. 3, reference numeral 304, delete "304" and insert --302--, therefor On Sheet 8 of 17, Fig. 9, reference numeral 904, line 2, before "EACH", delete "FOR", therefor In column 1, line 44, delete "an" and insert --a--, therefor In column 2, line 7, delete "an" and insert --a--, therefor In column 2, line 63, delete "be" and insert --by--, therefor In column 4, line 62, delete "URLS" and insert --URLs--, therefor In column 6, line 3, delete "304" and insert --302--, therefor In column 6, line 21, delete "FIG. 4." and insert --FIG. 4--, therefor Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,326,823 B2

In column 6, line 35, after "details", insert --.--, therefor

In column 6, line 47, delete "FIG. 7." and insert --FIG. 7--, therefor

In column 7, line 30, delete "e.g," and insert --e.g.,--, therefor

In column 8, line 7, delete "vector graphic" and insert --Vector Graphic--, therefor In column 11, line 1, delete "FIG. 13." and insert --FIG. 13--, therefor In column 11, line 48, delete "0, 0 to 5000, 5000" and insert --0,0 to 5000,5000--, therefor In column 11, line 49-50, delete "0, 0 to 8000, 8000" and insert --0,0 to 8000,8000--, therefor In column 12, line 54, delete "than" and insert --then--, therefor In column 13, line 58, delete "rile" and insert --tile--, therefor In column 15, line 53, delete "an" and insert --a--, therefor In column 16, line 64, after "controller", insert --2014--, therefor In column 18, line 12, in Claim 4, delete "implanted" and insert --implemented--, therefor